(12) United States Patent
Li et al.

(10) Patent No.: US 11,961,302 B2
(45) Date of Patent: Apr. 16, 2024

(54) VISUAL ANALYTICS TOOL FOR PROCTORING ONLINE EXAMS

(71) Applicant: The Hong Kong University of Science and Technology, Hong Kong (CN)

(72) Inventors: Haotian Li, Hong Kong (CN); Min Xu, Hong Kong (CN); Huan Wei, Hong Kong (CN); Huamin Qu, Hong Kong (CN); Yong Wang, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 0 days.

(21) Appl. No.: 17/724,732

(22) Filed: Apr. 20, 2022

(65) Prior Publication Data

US 2022/0392226 A1 Dec. 8, 2022

Related U.S. Application Data

(60) Provisional application No. 63/193,046, filed on May 25, 2021.

(51) Int. Cl.
*G06V 20/52* (2022.01)
*G06V 20/40* (2022.01)
*G09B 7/02* (2006.01)

(52) U.S. Cl.
CPC ............. *G06V 20/52* (2022.01); *G06V 20/44* (2022.01); *G09B 7/02* (2013.01)

(58) Field of Classification Search
None
See application file for complete search history.

(56) References Cited

U.S. PATENT DOCUMENTS 8,297,984 B2 10/2012 Rogers et al.
9,154,748 B2 10/2015 Hsu et al.
(Continued)

FOREIGN PATENT DOCUMENTS

CN 103208212 A 7/2013
CN 108335243 A 7/2018
(Continued)

OTHER PUBLICATIONS

Chung, H-S., et al., "Data Modeling for Monitoring and Visualizing of Learning Outcomes based on Assessment Standards", *Int'l Conference e-Learning, e-Bus, EIS, and e-Gov.*, EEE, '18, (pp. 131-132).
(Continued)

*Primary Examiner* — Reza Aghevli
(74) *Attorney, Agent, or Firm* — Leydig, Voit & Mayer, Ltd.

(57) ABSTRACT

A system for proctoring online exams includes a client-side computing system and a visual analytics system. The client-side computing system includes a camera configured to obtain video data corresponding to a user while taking an exam and one or more input devices configured to obtain interaction data, wherein the interaction data includes mouse movements of the user while taking the exam. The visual analytics system is configured to obtain the video data and the interaction data from the client-side computing system, analyze the exam data to detect abnormal behavior by the user based at least in part on mouse movement data, and generate one or more visualizations of the analyzed exam data to be used in determining whether or not the user has cheated during the exam.

20 Claims, 14 Drawing Sheets

(56) References Cited

U.S. PATENT DOCUMENTS

| | | | |
|---|---|---|---|
| 9,390,629 B2 | 7/2016 | Rogers et al. | |
| 10,008,124 B1* | 6/2018 | Holst | G09B 5/02 |
| 11,205,349 B2* | 12/2021 | Jaeh | G09B 5/00 |
| 11,295,626 B2* | 4/2022 | Jaeh | G09B 5/00 |
| 2011/0177484 A1 | 7/2011 | Morgan et al. | |
| 2011/0244440 A1* | 10/2011 | Saxon | G06F 9/5027 434/362 |
| 2012/0036215 A1* | 2/2012 | Perryman | H04L 67/1021 709/217 |
| 2012/0135388 A1 | 5/2012 | Foster et al. | |
| 2013/0344470 A1* | 12/2013 | Morgan | G09B 7/00 434/350 |
| 2015/0044649 A1* | 2/2015 | Voss | G06V 40/176 434/236 |
| 2016/0019379 A1* | 1/2016 | Sadeh | G06F 21/32 434/362 |
| 2016/0307451 A1* | 10/2016 | Logan | H04L 65/60 |
| 2017/0039869 A1* | 2/2017 | Gleim | G09B 5/12 |
| 2018/0225982 A1* | 8/2018 | Jaeh | G09B 5/00 |
| 2019/0156689 A1* | 5/2019 | Jaeh | G09B 5/00 |
| 2019/0392724 A1* | 12/2019 | Breed | G06V 40/19 |
| 2020/0118456 A1* | 4/2020 | Breed | G06F 3/167 |
| 2021/0295725 A1* | 9/2021 | Jaeh | G09B 5/00 |
| 2022/0068154 A1* | 3/2022 | Breed | G06V 10/82 |
| 2022/0103389 A1* | 3/2022 | Dua | G09B 21/001 |
| 2022/0392360 A1* | 12/2022 | Jaeh | G09B 5/00 |

FOREIGN PATENT DOCUMENTS

| | | | | |
|---|---|---|---|---|
| WO | WO 2014130769 A1 | | 8/2014 | |
| WO | WO-2023041940 A1 | * | 3/2023 | G06F 11/3438 |

OTHER PUBLICATIONS

Article entitled "Protect Test Integrity with ExamLock", *Effective Proctoring Solution/Online Proctoring/Examroom/* retrieved from https://examroom.aj on Sep. 24, 2021 (11 pages).

Ansusha, Sri, et al., "Efficient Monitoring in Online Tests Using ESDV Method", *International Journal of Computer Science & Information Technology (IJCITY)*, vol. 4, No. 5, (Oct. 2012), (pp. 261-276).

Li, Xuanchong, et al., 2015. "Massive Open Online Proctor: Protecting the Credibility of MOOCs Certificates", *In the 18th ACM Conference on Computer Supported Cooperative Work & Social Computing, Collaboration in the Open Classroom, CSCW 2015*, Vancouver, BC, Canada. Association for Computing Machinery, New York, NY, pp. 1129-1137, https://doi.org/10.1145/2675133. 2675245.

Costagliola, Gennaro, et al., 2009. "Monitoring online tests through data visualization", *IEEE Transactions on Knowledge and Data Engineering*, 21, 6 (2009), pp. 773-784, https://doi.org/10.1109/TKDE.2008.133.

Yang, Tsun-Yi, et al., 2019. "FSA-Net: Learning Fine-Grained Structure Aggregation for Head Pose Estimation from a Single Image", *In 2019 IEEE Conference on Computer Vision and Pattern Recognition*, CVPR 2019, Long Beach, CA, USA, (Jun. 16-20, 2019), IEEE, New York, NY, USA, pp. 1087-1096. https://doi.org/10.1109/CVPR.2019.00118.

Kuhnke, Felix, et al., 2019. "Deep Head Pose Estimation Using Synthetic Images and Partial Adversarial Domain Adaption for Continuous Label Spaces", *In 2019 IEEE / CVF International Conference on Computer Vision*, ICCV 2019, Seoul, Korea (South), (Oct. 27-Nov. 2, 2019), IEEE, New York, NY, USA, pp. 10164-10173, https://doi.org/10.1109/ICCV.2019.01026.

Ruiz, Nataniel, et al., 2018. "Fine Grained Head Pose Estimation without Keypoints", *In 2018 IEEE Conference on Computer Vision and Pattern Recognition Workshops*, CVPR Workshops 2018, Salt Lake City, UT, USA, (Jun. 18-22, 2018), IEEE, New York, NY, USA, pp. 2187-2196, https://doi.org/10.1109/CVPRW.2018.00281.

Baltrusaitis, Tadas, et al., 2012. "3D Constrained Local Model for Rigid and Non-Rigid Facial Tracking", *In 2012 IEEE Conference on Computer Vision and Pattern Recognition*, Providence, RI, USA, Jun. 16-21, 2012. IEEE, New York, NY, USA, 2610-2617 (8 pages), https://doi.org/10.1109/CVPR.2012.6247980.

Anusha, Sri, et al., "Efficient Monitoring in Online Tests Using ESDV Method". *International Journal of Computer Science & Technology (IJCSIT)*, vol. 4, No. 5 pp. 261-276, (Oct. 2012).

King, Darwin L et al., "E-Cheating: Incidence and Trends Among College Students", *Issues in Information Systems*, vol. 15, Issue 1, pp. 20-27 (2014).

Migut, Gosia, et al., "Cheat Me Not: Automated Proctoring of Digital Exams on Bring-Your-Own-Device", *Proceedings of the 23rd Annual ACM Conference on Innovation and Technology in Computer Science Education, ITICSE 2018*, Larnaca, Cyprus. ACM, New York, NY, USA, p. 388, (Jul. 2018). https://doi.org/10.1145/3197091.3205813.

Atoum, Yousef, et al., "Automated Online Exam Proctoring", *IEEE Transactions on Multimedia* vol. 19, Issue 7, pp. 1609-1624, (2017), https://doi.org/10.1109/TMM.2017.2656064.

Chuang, Chia Yuan, et al., "Detecting probable cheating during online assessments based on time delay and head pose", *Higher Education Research & Development* vol. 36, No. 6, pp. 1123-1137, (Mar. 21, 2017), https://doi.org/10.1080/07294360.2017.1303456.

Southgate, Erica, et al., 2019. "Artificial Intelligence and Emerging Technologies in Schools", *Department of Education and Training* (Australia), pp. 1-155, (Aug. 13, 2019), https://docs.education.gov.au/system/files/doc/other/aiet_final_report_august_2019.pdf.

Prathish, Swathi, et al., "An Intelligent System for Online Exam Monitoring", *In 2016 International Conference on Information Science (ICIS)*. AIS, Atlanta, GA, USA, pp. 138-143, (2016).

Narayanan, Athi, et al., 2014. "Yaw Estimation Using Cylindrical and Ellipsoidal Face Models", *IEEE Transactions on Intelligent Transportation Systems*, vol. 15, No. 5, pp. 2308-2320, (2014), https://doi.org/10.1109/TITS.2014.2313371.

* cited by examiner

VISUAL ANALYTICS TOOL FOR PROCTORING ONLINE EXAMS

CROSS-REFERENCE TO PRIOR APPLICATIONS

This application claims the benefit of U.S. Provisional Application No. 63/193,046 titled "A VISUAL ANALYTICS APPROACH TO FACILITATE THE PROCTORING OF ONLINE EXAMS," filed May 25, 2021, the entirety of which is incorporated herein by reference.

BACKGROUND

Online exams are emerging nowadays with the population of online learning. Methods of online proctoring can generally be categorized into three types: online human proctoring, semi-automated proctoring, and fully automated proctoring.

Online human proctoring relies on remote proctors who watch students during the whole online exam. However, it is very labor-intensive and the cost will be high when a large number of students attend an online exam.

Fully automated proctoring approaches often use machine learning techniques to identify cheating behaviors so as to eliminate the usage of manpower. However, existing fully automated proctoring approaches suffer from similar concerns as other machine learning methods in education. These concerns include the "black box" nature of the machine learning algorithms and unreliable decision-making led by biased training datasets. Due to these concerns, it is generally not possible to totally rely on fully automated methods to determine whether or not a student cheats during an online exam.

Different from fully-automated proctoring approaches, semi-automated proctoring approaches involve humans in the final decision-making. A semi-automated proctoring approach first detects suspected student cheating behaviors with machine learning techniques and the detection results will be further checked by proctors. However, existing technologies do not provide proctors with a convenient way to explore and analyze suspected student cheating behaviors. Also, existing technologies require that each student in the online exam uses multiple devices (e.g., two webcams, a gaze tracker, and an electroencephalogram (EEG) sensor) to record their exam process, which is not affordable for most educational institutions.

SUMMARY

In an exemplary embodiment, the present disclosure provides a system for proctoring online exams. The system for proctoring online exams comprises a client-side computing system and a visual analytics system. The client-side computing system comprises a camera configured to obtain video data corresponding to a user while taking an exam and one or more input devices configured to obtain interaction data, wherein the interaction data includes mouse movements of the user while taking the exam. The visual analytics system is configured to obtain the video data and the interaction data from the client-side computing system, analyze the exam data to detect abnormal behavior by the user, generate one or more visualizations of the analyzed exam data, and display the one or more visualizations to a reviewer to facilitate the reviewer determining whether or not the user has cheated during the exam. Analyzing the exam data to detect abnormal behavior is based at least in part on mouse movement data.

In a further exemplary embodiment, the one or more visualizations include information of a first level, a second level and a third level. The information of the first level includes a list of students taking the exam and overall risk evaluations associated with the students in the list of students. The information of the second level includes a list of questions in the exam and risk evaluations associated with respective questions in the list of question. The information of the third level includes obtained video data and/or obtained interaction data associated with a respective question among the list of questions.

In a further exemplary embodiment, the visual analytics system is configured to display a second visualization including the information of the second level in response to a reviewer selecting a respective student among the list of students in a first visualization including the information of the first level.

In a further exemplary embodiment, the visual analytics system is configured to display a third visualization including the information of the third level in response to the reviewer selecting a respective question among the list of questions in the second visualization.

In a further exemplary embodiment, the visual analytics system plays a video or animation in response to the reviewer selecting an image frame in the third visualization.

In a further exemplary embodiment, analyzing the exam data to detect abnormal behavior by the user further comprises analyzing head poses and head positions of the user based on the video data, and determining abnormal head movements based on the head poses and head positions.

In a further exemplary embodiment, the abnormal head movements comprise abnormal head poses and face disappearances. Determining the abnormal head movements based on the head poses and head positions further comprises determining an abnormal head pose in response to at least one of a yaw, a pitch, and a roll angles being greater than a threshold value, and determining a face disappearance in response to the head positions of the user being unavailable in a number of image frames in the video data.

In a further exemplary embodiment, analyzing the exam data to detect abnormal behavior by the user further comprises generating a bounding box corresponding to the face of the user on an image frame in the video data, wherein the size of the bounding box is based on a distance between the face of the user and a screen on the image frame.

In a further exemplary embodiment, the interaction data comprises data associated with copy, paste, focus, or blur events, mouse movement and mousewheel rolling. Analyzing the exam data to detect abnormal behavior by the user further comprises identifying the copy, paste, focus, or blur events.

In another exemplary embodiment, the present disclosure provides a method for proctoring online exams using a visual analytics system. The method for proctoring online exams comprises collecting exam data corresponding to a user taking an exam, analyzing the exam data to detect abnormal behavior by the user, generating one or more visualizations of the analyzed exam data, and displaying the visualizations to a reviewer to facilitate the reviewer determining whether or not the user has cheated during the exam. The exam data includes video data and interaction data. The one or more visualizations include information of a first level, a second level and a third level. The information of the first level includes a list of students taking the exam and overall risk evaluations associated with the students in the list of students. The information of the second level includes a list of questions in the exam and risk evaluations associated with respective questions in the list of questions. The information of the third level includes obtained video data and/or obtained interaction data associated with a respective question among the list of questions.

In a further exemplary embodiment, a second visualization including the information of the second level is displayed by the visual analytics system in response to a reviewer selecting a respective student among the list of students in a first visualization including the information of the first level.

In a further exemplary embodiment, a third visualization including the information of the third level is displayed by the visual analytics system in response to the reviewer selecting a respective question among the list of questions in the second visualization.

In a further exemplary embodiment, the visual analytics system plays a video or animation in response to the reviewer selecting an image frame in the third visualization.

In a further exemplary embodiment, analyzing the exam data to detect abnormal behavior by the user further comprises analyzing head poses and head positions of the user based on the video data, and determining abnormal head movements based on the head poses and head positions.

In a further exemplary embodiment, the abnormal head movements comprise abnormal head poses and face disappearances. Determining the abnormal head movements based on the head poses and head positions further comprises determining an abnormal head pose in response to at least one of a yaw, a pitch, and a roll angles being greater than a threshold value, and determining a face disappearance in response to the head positions of the user being unavailable in a number of image frames in the video data.

In a further exemplary embodiment, analyzing the exam data to detect abnormal behavior by the user further comprises generating a bounding box corresponding to the face of the user on an image frame in the video data, wherein the size of the bounding box is based on a distance between the face of the user and a screen on the image frame.

In a further exemplary embodiment, the interaction data comprises data associated with copy, paste, focus, or blur events, mouse movement and mousewheel rolling. Analyzing the exam data to detect abnormal behavior by the user further comprises identifying the copy, paste, focus, or blur events.

In a further exemplary embodiment, the visual analytics system includes one or more functions in at least one visualization among the one or more visualizations. The one or more functions are configured to adjust configurable parameters for detecting the abnormal behavior.

In yet another exemplary embodiment, the present disclosure provides a non-transitory computer-readable medium having processor-executable instructions stored thereon for proctoring online exams using a visual analytics system. The visual analytics system executes the instructions to facilitate collecting exam data corresponding to a user taking an exam, analyzing the exam data to detect abnormal behavior by the user, generating one or more visualizations of the analyzed exam data, and displaying the visualizations to a reviewer to facilitate the reviewer determining whether or not the user has cheated during the exam. The exam data includes video data and interaction data. The one or more visualizations include information of a first level, a second level and a third level. The information of the first level includes a list of students taking the exam and overall risk evaluations associated with the students in the list of students. The information of the second level includes a list of questions in the exam and risk evaluations associated with respective questions in the list of questions. The information of the third level includes obtained video data and/or obtained interaction data associated with a respective question among the list of questions.

In a further exemplary embodiment, a second visualization including the information of the second level is displayed by the visual analytics system in response to a reviewer selecting a respective student among the list of students in a first visualization including the information of the first level. A third visualization including the information of the third level is displayed by the visual analytics system in response to the reviewer selecting a respective question among the list of questions in the second visualization.

BRIEF DESCRIPTION OF THE DRAWINGS

Exemplary embodiments of the present disclosure will be described in even greater detail below in connection with exemplary figures, but it will be appreciated that the present disclosure is not limited to these examples. Additionally, all features described and/or illustrated herein can be used alone or combined in different combinations, unless contradicted by context. Features and advantages of various examples will become apparent by reading the following detailed description with reference to the attached drawings, which illustrate the following.

DETAILED DESCRIPTION

A system, device and method are disclosed to facilitate proctoring for online exams. Various examples of the present disclosure provide a visual analytics system, implementing online proctoring approaches disclosed hereinafter, which combine human efforts with machine learning techniques to achieve convenient, efficient and reliable proctoring for online exams. In some embodiments, the visual analytics system may include a data collection module, a detection engine and a visualization module. The data collection module may include a system or various input devices for collecting information during an online exam. For example, the data collection module may include a camera for collecting video data (or image data) during an online exam, which may be a webcam on a student's computer. The data collection module may also include one or more other input devices, such as a mouse and a keyboard for collecting interaction data (including mouse movement data) generated by students. The detection engine may include one or more processors (such as a processor of a server, a personal computer, or other computing device, or a plurality of processors of a plurality of computing nodes or clusters) configured to detect suspected cases of cheating based on collected exam videos and mouse movement data of individual students. The visualization module may also include one or more processors (which may be the same as or different from the one or more processors of the detection engine), as well as one or more displays, for generating visualizations to help proctors explore suspected cases via multiple levels of detail.

Compared with existing proctoring approaches that need multiple extra devices or sensors, the proctoring approaches disclosed herein reduce the requirements for the students' computing systems for taking online exams, thus ensuring convenience in deploying the disclosed approaches in real-time applications. Moreover, the disclosed proctoring approaches provide multi-level visualizations as straightforward and effective visual analytic tools, which help users (e.g., proctors) efficiently investigate suspected cases through comparisons across different students and questions, thus ensuring reliable judgments of cheating behaviors.

Figure 1A:
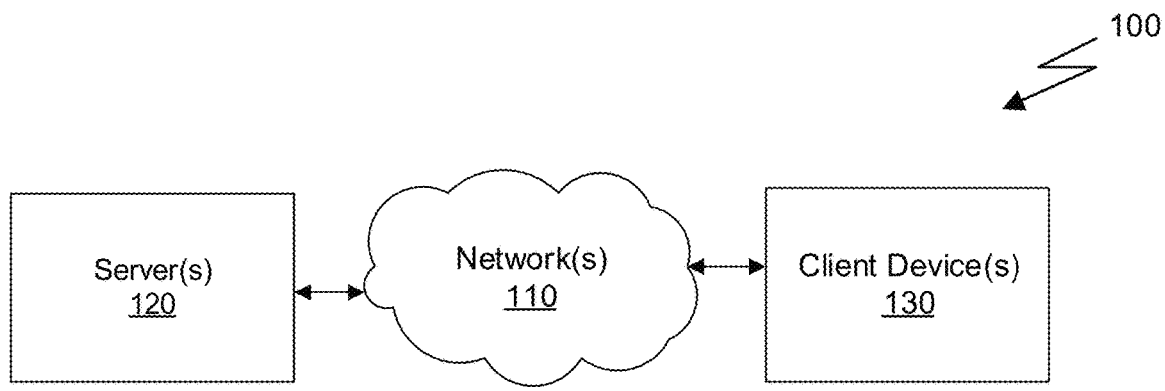
FIG. 1A illustrates an exemplary network environment, in accordance with one or more embodiments of the present disclosure.

FIG. 1A illustrates an exemplary network environment 100, in accordance with one or more examples in the present disclosure. An online exam implemented with the proctoring approaches disclosed herein may take place in the exemplary network environment 100. Network environments suitable for use in implementing embodiments of the disclosure may include one or more client devices 120, servers 130, and/or other device types.

Components of a network environment may communicate with each other via a network(s) 110, which may be wired, wireless, or both. By way of example, the network 110 may include one or more Wide Area Networks (WANs), one or more Local Area Networks (LANs), one or more public networks such as the Internet, and/or one or more private networks. Where the network includes a wireless telecommunications network, components such as a base station, a communications tower, or access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In some embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). A cloud-based network environment may be private (e.g., limited to a single organization), may be public (e.g., available to many organizations), and/or a combination thereof (e.g., a hybrid cloud environment).

By way of example and not limitation, a client device 120 may be embodied as a Personal Computer (PC), a laptop computer, a mobile device, a smartphone, a tablet computer, or any other suitable device.

Figure 1B:
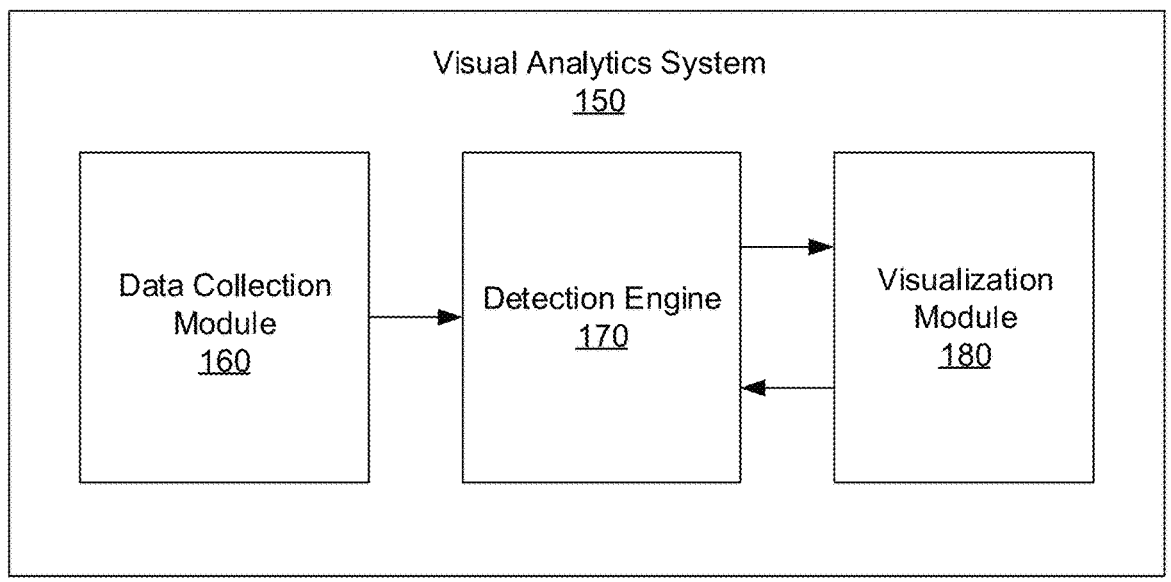
FIG. 1B-1C illustrate an exemplary visual analytics system, in accordance with one or more embodiments of the present disclosure.
Figure 1C:
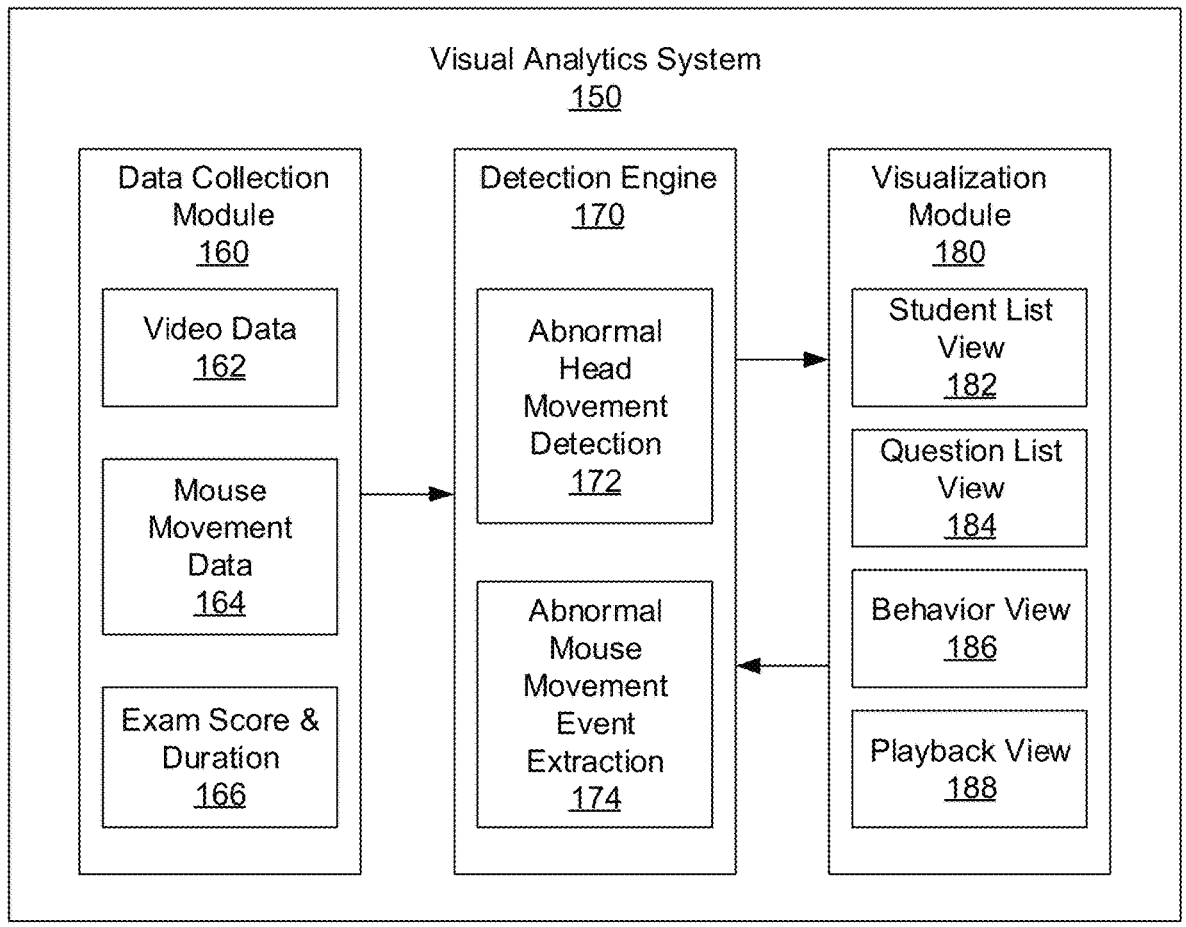

FIG. 1B illustrates an exemplary visual analytics system 150, in accordance with one or more examples in the present disclosure, and FIG. 1C depicts an example corresponding to the exemplary visual analytics system 150 of FIG. 1B. As shown in FIG. 1B, the visual analytics system 150 may include a data collection module 160, a detection engine 170 and a visualization module 180. As discussed above, the data collection module 160, detection engine 170, visualization module 180, or any combination thereof may be implemented in one or more devices (e.g., client devices, servers, etc.) in the network environment 100 in FIG. 1A.

The data collection module 160 may include an image/data acquisition device(s) (e.g., webcam or sensors), and/or a software program(s) (e.g., JavaScript plugin). In some examples, the data collection module 160, embodied as the software program(s), may be used to instruct external acquisition device(s) to collect data for later process. In some embodiments, the data collected by the data collection module 160 may include video recorded for students (as exam participants) during the exam, mouse movement data, or other suitable data. As shown in FIG. 1C, the data collection module 160 may collect various types of data, such as video data 162, mouse movement data 164, and information on exam score and duration 166.

The detection engine 170 may be configured to process the collected data from the data collection module 160 and identify suspected cases during the exam. The detection engine 170 may detect abnormal behaviors by analyzing the collected data based on a rule-based mechanism. In some embodiments, the detection engine 170 may implement machine learning algorithms to improve the intelligence of the detection engine 170. As shown in FIG. 1C, the detection engine 170 may perform detections such as abnormal head movement detections 172 and abnormal mouse movement data detections 174.

The visualization module 180 may be configured to generate visualizations based on the results from the detection engine 170 and cause the display of the visualizations. As shown in FIG. 1C, the visualization module 180 may generate visualizations in different levels of detail, including a Student List View 182, a Question List View 184, a Behavior View 186, and a Playback View 188.

Figure 2:
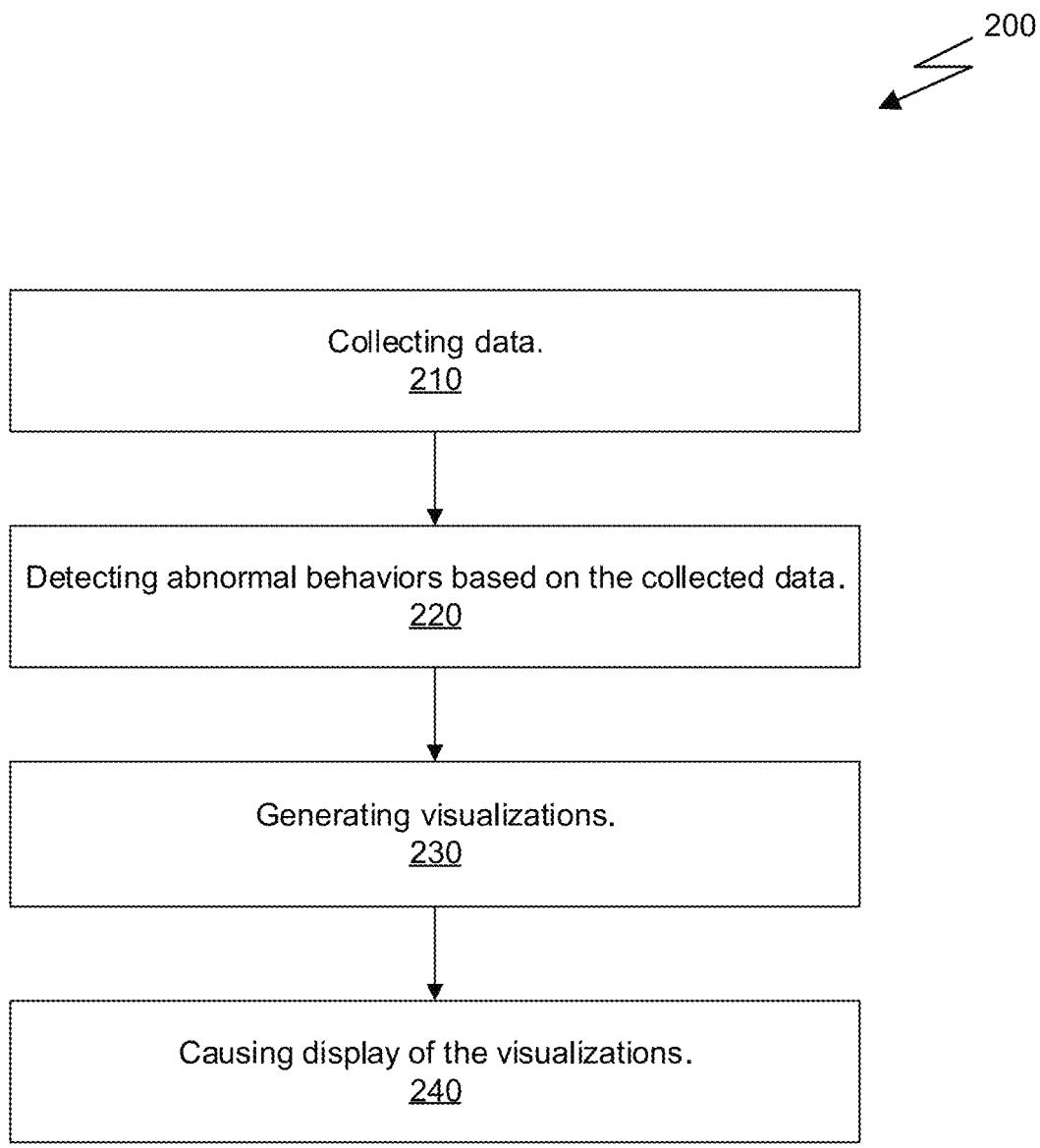
FIG. 2 illustrates an exemplary visual analytics process for an online exam, in accordance with one or more embodiments of the present disclosure.

FIG. 2 illustrates an exemplary visual analytics process 200 for an online exam, in accordance with one or more examples in the present disclosure. The visual analytics process 200 may be executed by the visual analytics system 150 in FIG. 1B for an exemplary online exam that takes place in the network environment 100 in FIG. 1A.

At step 210, the visual analytics system collects data for the online exam. In some embodiments, the visual analytics system collects videos of individual students, mouse movement data and other related information like exam score and exam duration. In the present disclosure, the term, mouse movement data, denotes all the collected interaction data generated by mouse or keyboard interactions. In some embodiments, the exam video for each student may be acquired by a webcam that is integrated in or connected to a device used by the student for taking the exam.

In some embodiments, the data collection module of the visual analytics system may include a software program that is installed in the student's device for collecting mouse movement data. The program may utilize an API for web-based online exams. For instance, a JavaScript plugin may utilize the document object model (DOM) structure, which is an API for hypertext markup language (HTML) and extensible markup language (XML) documents. It will be appreciated that the program may be generalizable to collect mouse movements on any other web pages. The program (e.g., the JavaScript plugin) may be automatically loaded with the web page and does not require proctors or students to conduct extra settings. The program may be confined to work solely on the web page containing the exam, and terminate data collection after the student completes the online exam. In this way, the program will not lead to the privacy concerns of collecting data in the background. The mouse movement data may include mouse positions and DOM event types. The DOM event types may include, for example, the following six types.

(1) Blur: an event of the web page losing focus, which is triggered when the participant leaves the current web page.
(2) Focus: an event of the web page being the current focus, which is triggered when the participant enters the web page.
(3) Copy: an event of content being copied from the current web page by using either mouse or keyboard.
(4) Paste: an event of content being pasted to the current web page by using either mouse or keyboard.
(5) Mousemove: an event of the mouse moving on the web page.
(6) Mousewheel: an event of the mousewheel rolling to scroll on the web page.

In further embodiments, the data collection module of the visual analytics system may collect data associated with the movement of mouse and/or mousewheel to monitor the trajectory of the mouse. For instance, the data may include positions (e.g., coordinates) of the mouse cursor on the screen.

At step 220, the visual analytics system detects abnormal behaviors based on the collected data. In some embodiments, the visual analytics system may implement a rule-based detection engine to identify suspected cases from both video and mouse movement data. For instance, the rules may be associated with abnormal head movements and/or abnormal mouse movements.

The visual analytics system may characterize head movements from two perspectives: head poses and head positions. Head poses indicate where a student is looking during the online exam. Head positions represent how a student moves his/her head to use different devices or materials. The visual analytics system may detect the position of a student's face in the video to delineate the corresponding head position. In some instances, the visual analytics system may implement machine learning algorithms to perform face detections. The visual analytics system may process all the video frames for face detection. Alternatively, the visual analytics system may process a set of sampled video frames to improve the processing speed and alleviate the computational cost. For example, the visual analytics system may process one video frame for every five frames.

Figure 3:
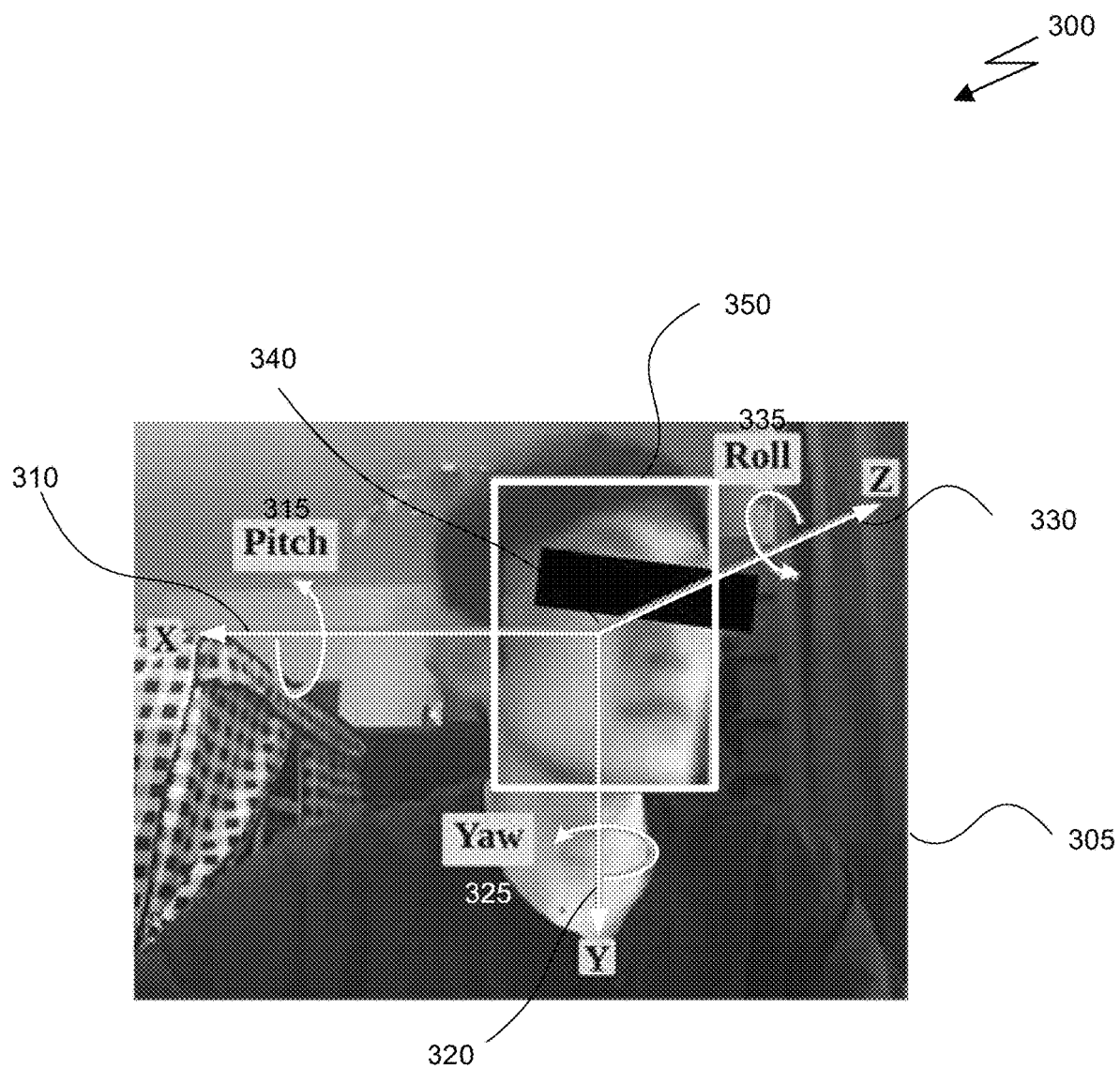
FIG. 3 illustrates an exemplary process of detecting head movements in an exemplary video frame, in accordance with one or more embodiments of the present disclosure.

FIG. 3 illustrates an exemplary process 300 of detecting head movements in an exemplary video frame 305, in accordance with one or more examples in the present disclosure. The visual analytics system may analyze angles and positions associated with the student's head to determine the head pose and position. The head pose may be evaluated by a pitch angle 315, a yaw angle 325 and a roll angle 335 with respect to a three-dimensional (3D) coordinate system. To illustrate, the image frame 305 as shown in FIG. 3 is a mirror image that is flipped horizontally. In the 3D coordinate system, the X-axis 310 may point to the right of the student (that is to the left of the mirror image 305), the Y-axis 320 may point to the ground, and the Z-axis 330 may point to the computer screen. The visual analytics system may determine a rectangular bounding box 350 that appropriately encloses the student's face, and set the center of the rectangular bounding box 350 as the origin 340 of the 3D coordinate system. As such, the visual analytics system may determine the head position as the origin 340. The position of the origin 340 may be expressed by a set of pixel coordinates of the video frame 305. As shown in FIG. 3, the pitch angle 315, the yaw angle 325 and the roll angle 335 may be associated with head rotations with respect to the X-axis 310, Y-axis 320 and Z-axis 330, respectively. In some embodiments, the visual analytics system may vary the size of the bounding box 350 in accordance with changes in the distance between the student's face and the screen in the recorded video.

The visual analytics system may detect various types of abnormal head movements, such as face disappearance and abnormal head pose, by analyzing head positions and head poses in the recorded video. When the visual analytics system finds a student's head position being unavailable during a period of time (e.g., in a number of consecutive video frames), the visual analytics system may identify this period as associated with a face disappearance event. A face disappearance event may occur when the student's face is not captured by an imaging device (e.g., a webcam). For example, a face disappearance event may result from situations when the student leaves the room or covers the camera. Alternatively, a face disappearance event may occur when the captured face is not detected by the face detection algorithm. For instance, the face detection process may return a null finding when the student's face is partially covered by another object, such as a cup, or when the student bows his/her head deeply. The visual analytics system may identify these face disappearance events as suspected cases.

In some embodiments, the visual analytics system may implement various types of neural network models for face detection, such as Region-based convolutional neural network (R-CNN), Fast R-CNN, Faster R-CNN and other types of neural networks. For instance, the visual analytics system may implement a pre-trained Faster R-CNN model to detect faces in the sampled video frames of the recorded video. The visual analytics system may extract the head position in Frame i as represented by coordinates of a bounding box (e.g., the bounding box 350 in FIG. 3). The head position may be described by a vector, $[x_i^{min}, y_i^{min}, x_i^{max}, y_i^{max}]$, where $(x_i^{min}, y_i^{min})$ is the coordinates of the upper-left corner of the bounding box 350 and $(x_i^{max}, y_i^{max})$ is the coordinates of the lower-right corner of the bounding box 350. The visual analytics system may also determine a probability score of correct detection based on outputs of the neural network model. The probability score of correct detection may be determined for each detected head position to indicate the reliability of the face detection. In some instances, the visual analytics system may set a threshold value, such as 0.95, for the probability score so as to filter out detection results with less confidence. When the face detection returns a null finding result, indicating that the student's face is not detected in the Frame i (e.g., the frame 305), the visual analytics system may label the Frame i as being associated with a face disappearance event. The visual analytics system may record the number of frames associated with one or more face disappearance events as $n_f^s$ for Student s. Additionally and/or alternatively, the visual analytics system may estimate time periods associated with the face disappearance events based on the number of labeled frames and the frame rate for recording the video.

In some embodiments, the visual analytics system may implement neural network models to estimate head poses. To illustrate, the head pose at Frame i may be described by a 3D vector, $[pitch_i^s, yaw_i^s, roll_i^s]$, which represents the head rotation with respect to the three axes as shown in FIG. 3. In some variations, the 3D vector may be reduced to a two-dimensional (2D) vector, $[pitch_i^s, yaw_i^s]$, which utilizes the pitch and yaw angles as indicators for detection of abnormal head poses. The pitch angle (e.g., the angle 315 as shown in FIG. 3) indicates where the student looks vertically, and the yaw angle (e.g., the angle 325 as shown in FIG. 3) indicates where the student looks horizontally.

The visual analytics system may take into account different exam settings by different students, which may lead to different ranges of head positions and head poses. For instance, the visual analytics system may normalize each student's head positions and head poses at each video frame to (−1, 1) by applying min-max normalization, which is performed based on the minimum and maximum values of head positions and/or head poses for each student. For ease of describing the techniques in the present disclosure, all the head poses (expressed by $[pitch_i^s, yaw_i^s, roll_i^s]$ or $[pitch_i^s, yaw_i^s]$) and head positions (expressed by $[x_i^{min}, y_i^{min}, x_i^{max}, y_i^{max}]$) are normalized.

In some embodiments, students may use webcams during the online exam, which may be placed at various places or angles. The visual analytics system may determine parameters, referred to as z-scores, for evaluating abnormal head poses. The z-scores may be determined based on an assumption that a student's head pose distribution follows a normal distribution. The process of determining z-scores may include the following steps. First, the visual analytics system may calculate an average (or mean) and a standard deviation of the head pose for Student s in his/her video. The average head pose may be expressed by a vector, $[\overline{pitch^s}, \overline{yaw^s}]$. The standard deviation may be expressed by a vector, $[\sigma_{pitch^s},$ $\sigma_{yaw^s}]$. Second, the visual analytics system may calculate a vector including z-scores at Frame i by the following expression, $$\left[\frac{pitch_i^s - \overline{pitch^s}}{\sigma_{pitch^s}}, \frac{yaw_i^s - \overline{yaw^s}}{\sigma_{yaw^s}}\right].\qquad\text{Eq. (1)}$$

The visual analytics system may preset threshold values for any of the z-scores in the Equation 1 to identify abnormal head poses. For example, the default threshold value may be 3, following the Three-Sigma rule. If the absolute value of any z-score in the vector is larger than a preset threshold, the corresponding head pose may be labeled as abnormal. The visual analytics system may record the total number of abnormal head poses of Students as $n_h^s$. The threshold may be adjusted through a user interactive interface generated by the visualization module of the visual analytics system.

In some embodiments, the visual analytics system may detect abnormal mouse movements by evaluating the DOM events. For example, the visual analytics system may detect a few representative suspected mouse movements, including "copy", "paste", "blur" and "focus" events, as abnormal mouse movements or suspected cases. For example, a "copy" event may indicate that the student copies question contents and searches it for answers. A following "Paste" event may signify that the student pastes the answer from other sources, such as another website or electronic lecture notes. "Blur" and "focus" events may indicate that a student leaves the current exam web page and gets back later. Since "copy" and "paste" events are highly related to each other, the visual analytics system may count the total number of "copy" and "paste" events of Student s as $n_c^s$. Likewise, the visual analytics system may count the total number of "blur" and "focus" events of Students as $n_b^s$. Similar to the normalization process applied to the head poses and head positions, the visual analytics system may normalize each student's mouse positions to (−1, 1).

In some embodiments, the visual analytics system may further estimate students' risk levels on each question, based on the suspected cases identified by the aforementioned processes. The estimation may be performed by the following steps. First, the visual analytics system may normalize each of the occurrence numbers of suspected cases on Question q to (0, 1) by applying min-max normalization. The occurrence numbers may be expressed in a vector, $[n_f^{sq}, n_h^{sq}, n_c^{sq}, n_b^{sq}]$. For each type of abnormal behaviors described by $[n_f^{sq}, n_h^{sq}, n_c^{sq}, n_b^{sq}]$ on Question q, the minimum number of instances of the type is transformed to 0, and the maximum number of instances is transformed to 1. For ease of understanding, all the values in the vector $[n_f^{sq}, n_h^{sq}, n_c^{sq}, n_b^{sq}]$ disclosed hereinafter are normalized. Then, the visual analytics system may determine the overall risk of Students on Question q by the expression, $$\text{risk}^{sq} = \Sigma t \in \{f, h, c, b\} W_t \times n_t^{sq}, \qquad\text{Eq. (2)}$$

where $W_t$ is a customized weight of a type (t) of abnormal behavior (or suspected case). The weights of the types of abnormal behaviors may all be set to 1 by default. The weights may be adjusted via the user interactive interface generated by the visual analytics system.

Referring back to FIG. 2, at step 230, the visual analytics system generates visualizations. The visualizations may implement straightforward and intuitive visual designs, to help proctors explore and analyze students' high-risk behaviors based on exam videos and mouse movement data. The visual analytics system may generate the visualizations in different levels of detail, thus ensuring convenient, efficient, and reliable proctoring.

Figure 4A:
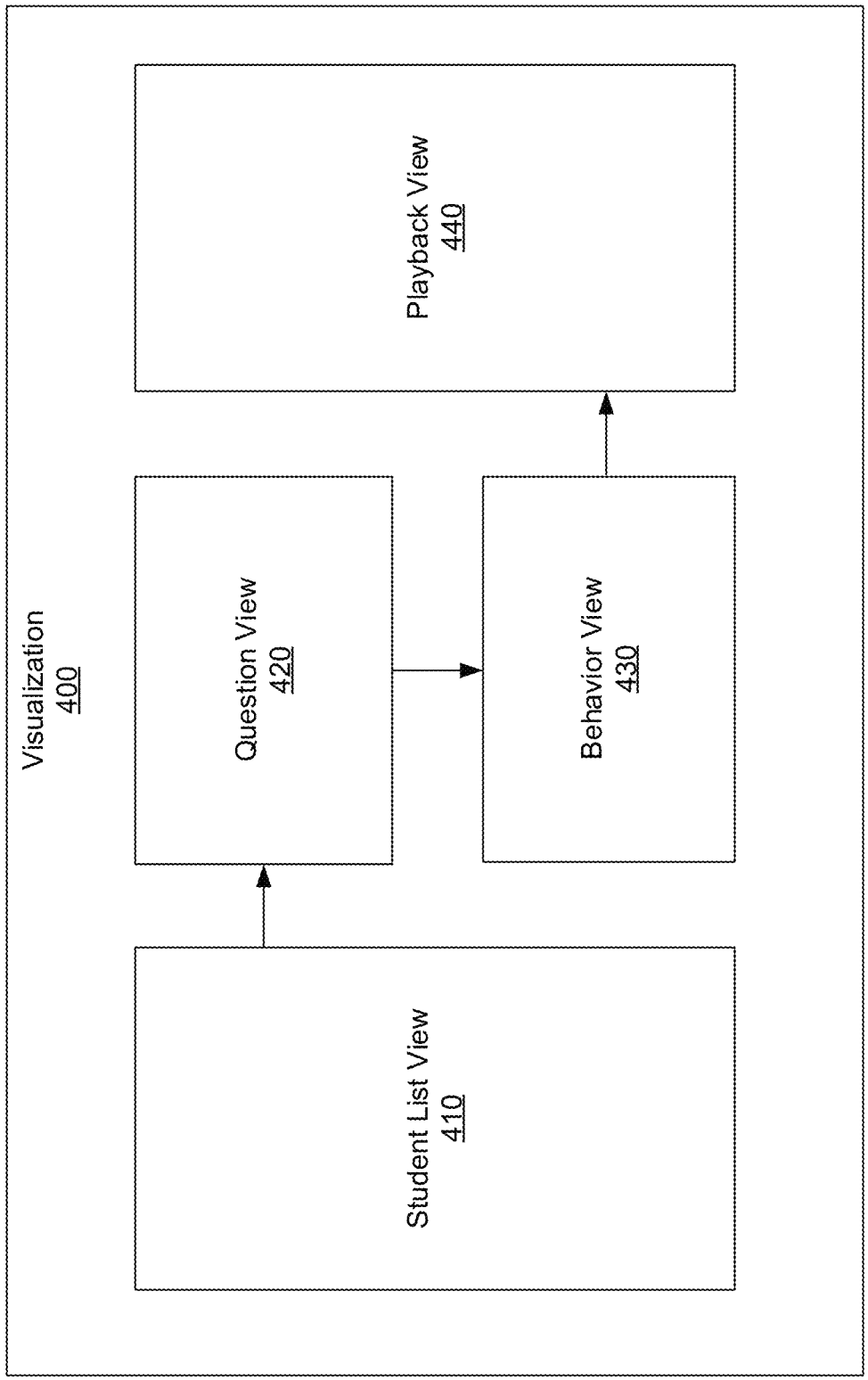
FIGS. 4A-4B illustrate an exemplary visualization diagram, in accordance with one or more embodiments of the present disclosure.
Figure 4B:
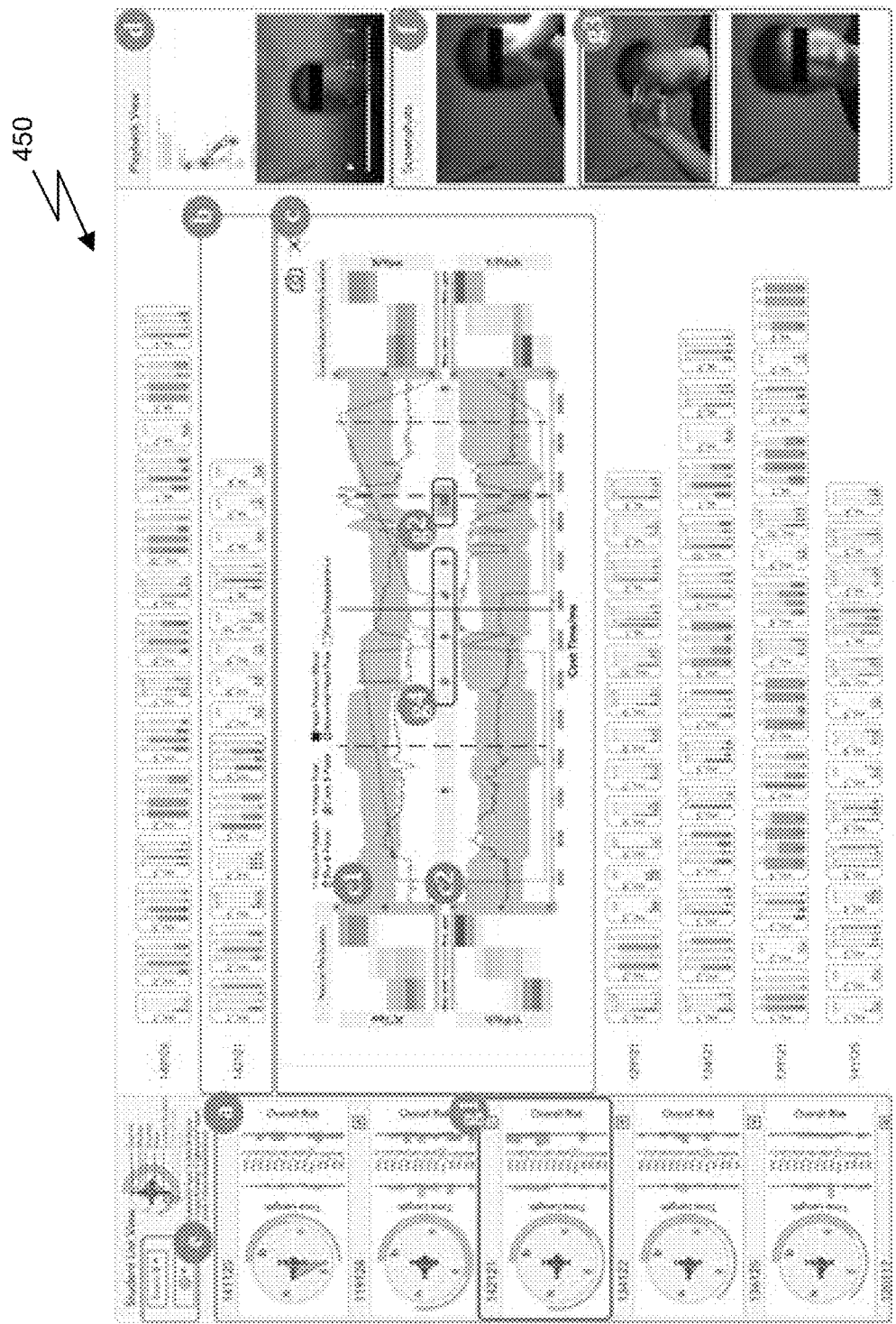

FIG. 4A depicts an exemplary visualization diagram 400, in accordance with one or more examples of the present disclosure, and FIG. 4B depicts an example screenshot 450 corresponding to the exemplary visualization diagram 400 of FIG. 4A. The diagram 400 may include visualizations with different levels of views. For example, the diagram 400 may include a Student List View 410, a Question View 420, a Behavior View 430 and a Playback View 440. The Student List View 410 may present an overview of all students in an online exam. The Question View 420 may expand risk levels over all questions included in the online exam for any of the students in the Student List View 410 upon selection. The Behavior View 430 may provide further details of a specific question selected in the Question View 420 for the student selected in the Student List View 410. The Playback View 440 may present raw data, including the video and mouse movement data, associated with high-risk behaviors displayed in the Behavior View 430.

As mentioned above, a Student List View 410 may provide proctors with an overview of the risk levels of all students who have participated in an online exam. The Student List View 410 may include multiple components, such as an indicator(s) showing an overall risk of all suspected types and comparisons between the risk of a current student and the overall risk of all the students. In some embodiments, the Student List View 410 may include a plurality of rows, with each row visualizing multiple components to indicate the risks of one student.

Figure 5A:
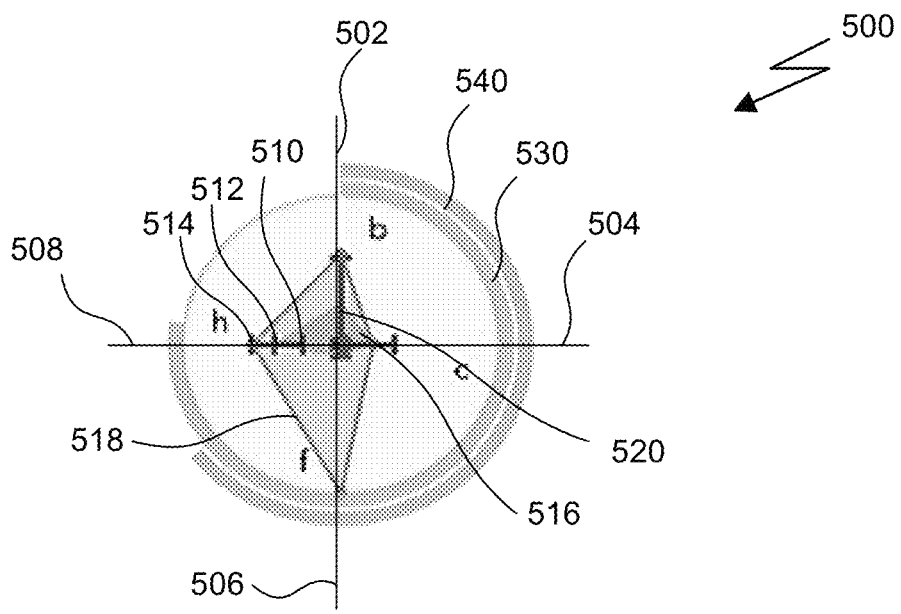
FIGS. 5A-5B illustrate exemplary components included in a Student List View as shown in FIGS. 4A-4B, in accordance with one or more embodiments of the present disclosure
Figure 5B:
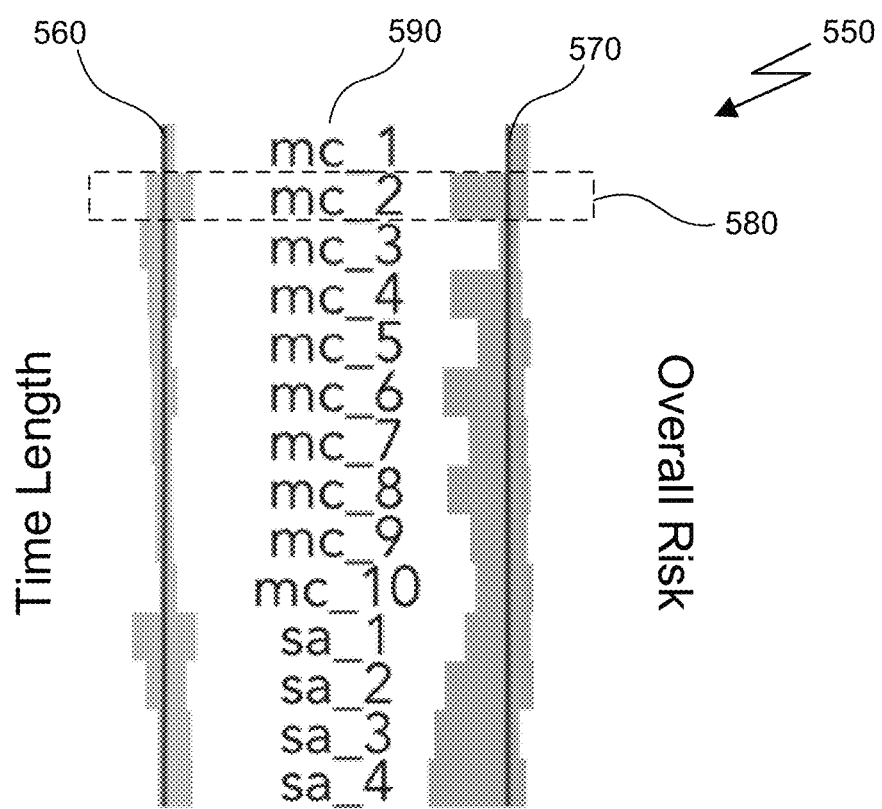

FIGS. 5A and 5B illustrate exemplary components included in a Student List View 410 as shown in FIG. 4. FIG. 5A illustrates an exemplary glyph 500 showing an overall risk of all types of high-risk (or abnormal) behaviors for a student. FIG. 5B illustrates an exemplary graph 550 showing comparisons between the student and all students in terms of risk and time spent on each question.

As shown in FIG. 5A, the glyph 500 may include two radar charts, and two outer radial bar charts, 530 and 540. The two radar charts may be overlapping and include four equi-angular spokes (referred to as axes), which are associated with different types of high-risk behaviors. In the radar charts, an axis 502 is labeled as b, which is associated with blur and focus events. An axis 504 is labeled as c, which is associated with copy and paste events. An axis 506 is labeled as f which is associated with events of face disappearances. An axis 508 is labeled as h, which is associated with events of abnormal head poses. The radial bar chart 530 indicates the time length the student spent in the exam, and the radial bar chart 540 indicates the student's score for the exam. The design of the glyph 500 follows the effectiveness principle by encoding the most important information, such as cheating risk, using a strong visual channel (i.e., spatial position) and encoding the less important information, such as time spent and scores, with a weaker channel (i.e., angle). As shown in FIG. 5A, the glyph 500 may also implement a boxplot design and visualize the $1^{st}$, $2^{nd}$, and $3^{rd}$ quartiles (i.e., 510, 512, and 514 on the axis 508, respectively) of the normalized risk levels on each axis. In a boxplot, when the minimum and maximum values are defined as $0^{th}$ percentile and $100^{th}$ percentile in a dataset, respectively, the $1^{st}$, $2^{nd}$ and $3^{rd}$ quartiles represent the $25^{th}$, $50^{th}$, and $75^{th}$ percentiles in the dataset, respectively. The $2^{nd}$ quartile in the boxplot represents the median value of the normalized risk level on each axis. The boxplots on the axes may be calculated based on overall risk levels by all students for the respective types of high-risk behaviors. The glyph 500 may further visualize mean values on the axes (e.g., mean value 520 on the axis 502), which may also be calculated based on overall risk levels by all students. An area 516 is determined by connecting the mean values on the four axes in the radar charts, which indicate overall risk evaluations by all students. On the other hand, an area 518 is determined by connecting risk values associated with the current student. In this way, the glyph 500 may provide proctors with visualized statistical metrics for convenient comparisons between the current student and all students. In some embodiments, the range of each axis may be (0, 1) from the center to the edge. It will be appreciated that other designs may be implemented to plot these statistical metrics.

As shown in FIG. 5B, the graph 550 may include two diverging bar charts 560 and 570, including rows associated with a plurality of questions in the exam. The graph 550 may also include a legend 590 showing denotations of the plurality of questions for the associated rows. Each bar chart includes a left side and a right side divided by the middle line. The bar chart 560 may show the time spent on each question in a respective row 580. The right side of the bar chart 560 shows the average time spent by all students, whereas the left side of the bar chart 560 presents the time spent by the current student. Both time spent by all students and the current student are normalized. The bar chart 570 may show each question's overall estimated risk in a respective row 580. The risk of each question may be calculated by Equation 2. The right side of the bar chart 570 shows an average risk for all students, whereas the left side of the bar chart 560 presents the risk of the current student. Both the risk of all students and the risk of the current student are normalized. The length of each bar in the bar charts 560 and 570 encodes the normalized value. The design of diverging bar charts provides for convenient comparisons between a student and overall performance by all students.

The visual analytics system may further implement various functions to enable interactions by proctors in the Student List View 410. In some examples, the student List View 410 may implement a tooltip, which may display the normalized risk level when the mouse hovers on the radar chart. In some instances, the Student List View 410 may implement a control panel allowing proctors to adjust a set of configurable parameters for risk estimation, such as the threshold of abnormal head poses, the weights of different types of high-risk behaviors and other parameters disclosed in the present disclosure. The control panel may also provide functions, such as sorting and/or selection of online exams and/or students in an exam. In some variations, the control panel may include a button, such as a "plus" icon on the upper-left corner of each row associated with a student, allowing proctors to open the student's Question List View 420 by clicking on the button.

Figure 6:
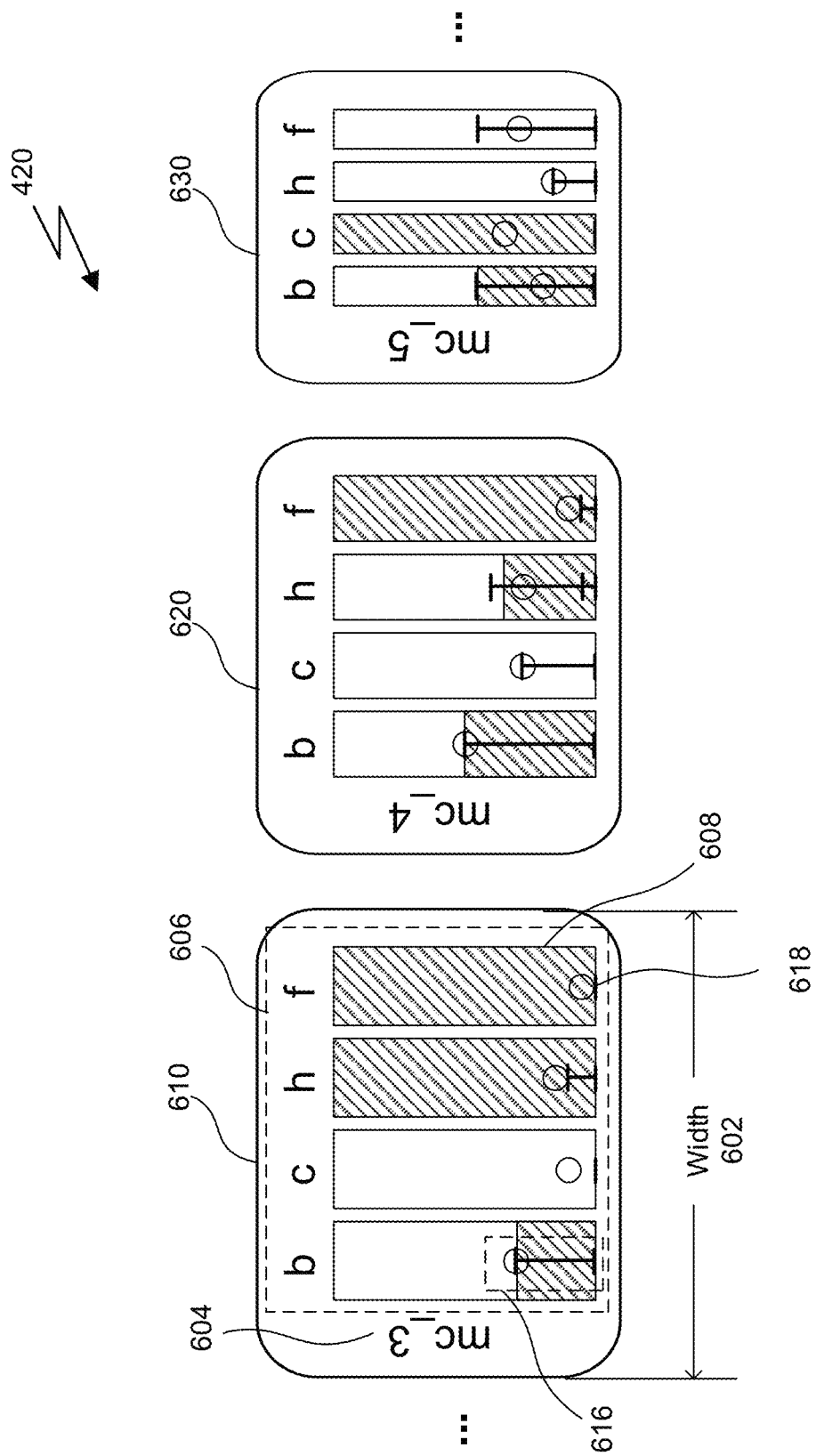
FIG. 6 illustrates exemplary blocks included in a Question List View as shown in FIGS. 4A-4B, in accordance with one or more embodiments of the present disclosure.

A Question List View 420 may be designed to help proctors quickly locate high-risk questions for further investigation. FIG. 6 illustrates exemplary blocks included in a Question List View 420. In the Question List View 420, each question may be represented by a question block (or block). As shown in FIG. 6, Question mc_3 is represented by a block 610, Question mc_4 is represented by a block 620, and Question mc_5 is represented by a block 630. The width (e.g., a width 602 of the block 610) of each block encodes the estimated risk level of the corresponding question in such a way that the higher the overall risk of the question is, the wider the corresponding block appears to be. As such, questions with high risks are easier to be noticed by proctors. Other designs, such as changes in shape, size, or color, may be applied to the appearance of the blocks to emphasize question blocks indicating higher risks. All the blocks include the same elements. For example, the block 610 may include a legend 604 showing a question identification (ID) corresponding to the block 610, and a bar chart 606. The bar chart 606 may include a plurality of bars 608 indicating normalized risk levels of different types of high-risk behaviors. To illustrate, the block 610 includes four bars 608, which are labeled as b for "blur and focus," c for "copy and paste," h for "abnormal head pose," and f for "face disappearance," respectively. In each bar 608, the risk for a type of high-risk behavior associated with the current student as calculated in the aforementioned step 220 may be visualized as the patterned portion of the bar 608. In some examples, each bar 608 in the bar chart 606 may be overlaid by a boxplot 616, which may indicate statistical merits of all students for a respective type of high-risk behavior. The boxplot 616 may include the $1^{st}$, $2^{nd}$ and $3^{rd}$ quartiles of the normalized risk levels as described in the step 220. The bar chart 606 may also include circles 618 overlaid on the bars 608. The circle 618 on the bar 608 may encode the average risk level among all students on the same question. In some embodiments, Proctors may be provided with an option of expanding the Behavior View 430 of a question for further inspection by clicking the corresponding question block.

Figure 7A:
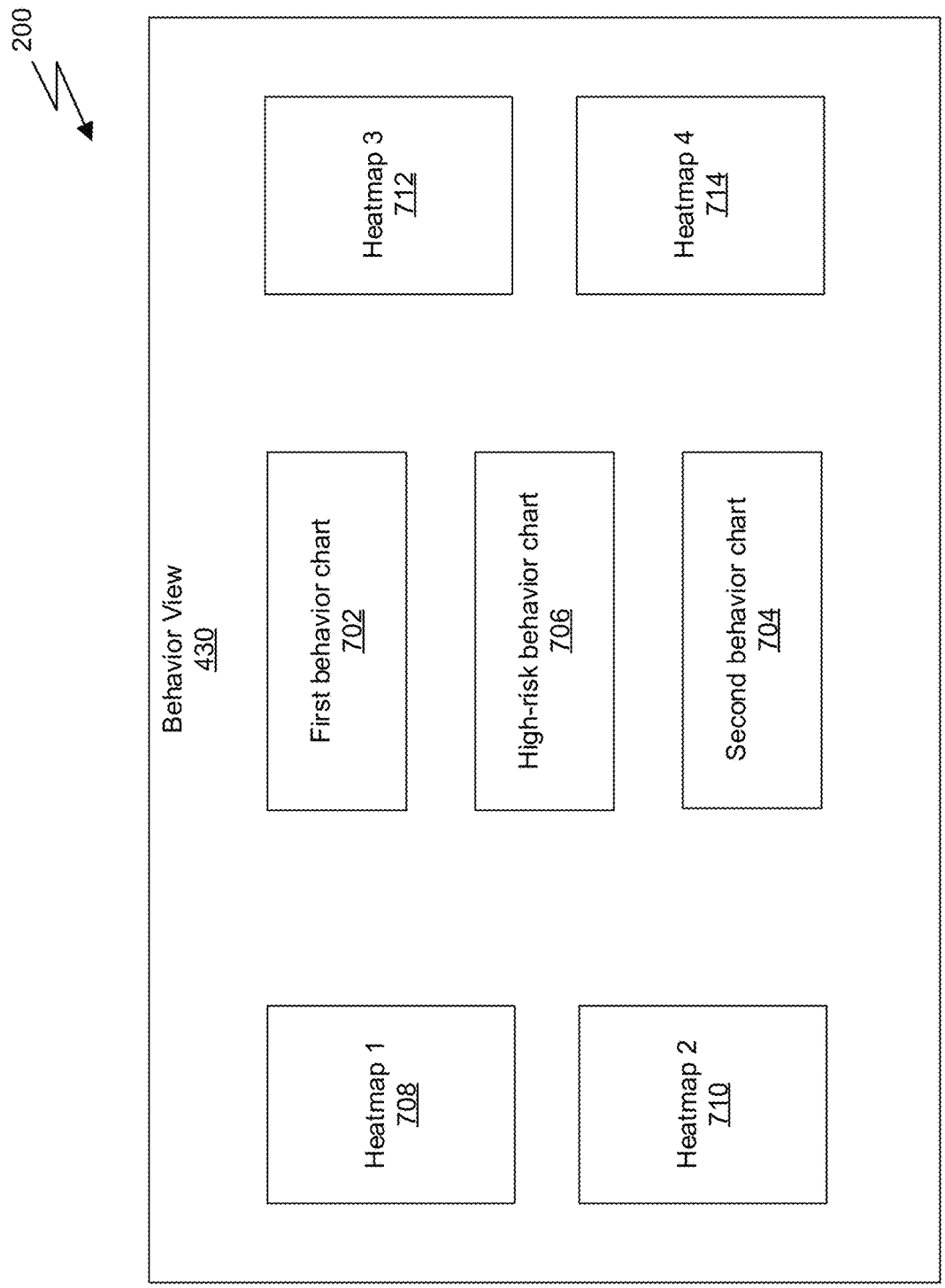
FIG. 7A illustrates an exemplary layout of a Behavior View as shown in FIGS. 4A-4B, in accordance with one or more embodiments of the present disclosure.

The Behavior View 430 may provide proctors with a detailed understanding of how the student's head and mouse move during his/her problem-solving process, thus enabling the fast location of high-risk behaviors and further inspection. In some embodiments, the Behavior View 430 may include various types of charts. FIG. 7A illustrates an exemplary layout of a Behavior View 430 as shown in FIG. 4, in accordance with one or more examples of the present disclosure. As shown in FIG. 7A, the Behavior View 430 may include a first behavior chart 702, a second behavior chart 704, a high-risk behavior chart 706, and periphery heatmaps 708, 710, 712 and 714. The first and second behavior charts 702 and 704 may be plotted to show detailed head and mouse movements, respectively. The high-risk behavior chart 706 may be plotted to show identified high-risk behaviors extracted from the first and second behavior charts 702 and 704. The periphery heatmaps 708, 710, 712 and 714 may indicate comparisons of selected behaviors in the first and second behavior charts 702 and 704 across students and questions.

Figure 7B:
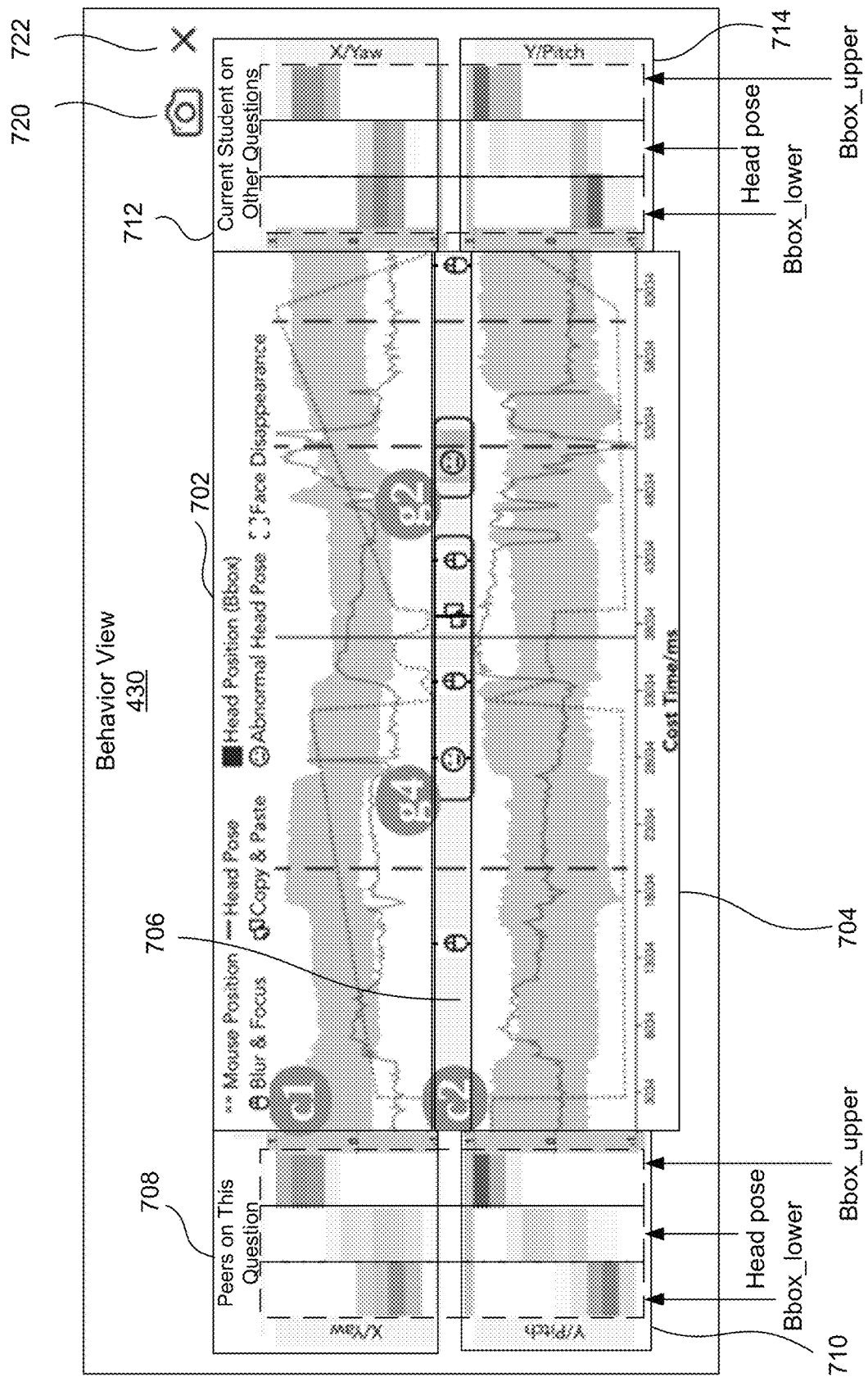
FIG. 7B illustrates exemplary contents in the charts as shown in FIG. 7A, in accordance with one or more embodiments of the present disclosure.

FIG. 7B illustrates exemplary contents in the charts as shown in FIG. 7A, in accordance with one or more examples of the present disclosure. As shown in FIG. 7B, the first behavior chart 702 may present the mouse positions and ranges of bounding boxes along the X-axis, and the second behavior chart 704 may present the corresponding information along the Y-axis. In some instances, the yaw angles of head poses may also be plotted in the first behavior chart 702, and the pitch angles may be plotted in the second behavior chart 704. The shadowed area in the first behavior chart 702 or the second behavior chart 704 may represent the range of bounding boxes of head positions on one axis. In other words, the upper bound of the shadowed area may be $x_{max}$ or $y_{max}$ for the bounding box, while the lower bound may be $x_{min}$ or $y_{min}$ for the bounding box. In some embodiments, animated visualizations of mouse movements and raw videos may be provided in the Playback View 440 so as to help proctors understand how a student has behaved during the online exam. The suspected case chart 706 between the two behavior charts 702 and 704 shows the positions of all suspected cases or abnormal behaviors. The visual analytics system may plot a bar for each suspected case detected by the detection engine of the visual analytics system and place a customized glyph on the bar denotes the type of the suspected case.

On the left and right sides of the behavior charts 702 and 704, four periphery heatmaps 708, 710, 712 and 714 may be designed to display other students' behaviors on the current question and the current student's behaviors on other questions, respectively. The four periphery heatmaps 708, 710, 712 and 714 have the same Y-axes as those of the behavior charts 702 and 704. Each heatmap may include three columns, which represent the frequency distributions of the lower bounds of head positions, head poses and the upper bounds of head positions from left to right. The color of each column in the periphery heatmaps is the same as the corresponding line chart in the first or second behavior charts 702 and 704. The opacity of each column encodes the frequency of head poses or head positions that fall into a specific interval (e.g., the frequency of head poses with a value between 0 and 0.1). The heatmaps are designed to facilitate the comparison of student behaviors across students and questions. The heatmaps provide comparisons necessary for reliable high-risk behavior analysis, by allowing proctors to consider two important factors affecting students' behaviors, which are the students' habits and the specific questions that the students are working on.

In some embodiments, the Behavior View 430 may include other interactive functions, such as function 720 for taking a screenshot or function 722 to close the Behavior View 430 for a specific question.

The Playback View 440 may provide proctors with a choice to review the suspected cases and further confirm whether a suspected case indicates a real cheating case, especially for some ambiguous cases. The Playback View 440 may help with cases when normal behaviors, such as drinking water, are misclassified as suspected cases. In some embodiments, the Playback View 440 may serve as a complement to the behavior charts in Behavior View 430. The Playback View 440 may include different visual contents, such as an animated mouse movement visualization at the top and a raw video player at the bottom. The animated mouse movement visualization may implement a heatmap to show the number of times that the mouse stays in an area. For instance, in the color scale of the heatmap, blue may be used to denote few visits and red may be used to denote frequent visits. In the Playback View 440, the raw video player and the animated visualization of mouse movements may be linked together to play synchronously. In some examples, the raw video player and the animated visualization of mouse movements can be controlled by clicking on the behavior charts in the Behavior View 430 to play from a selected time point. The raw video player may support multiple interactions, including play/pause, skip and play in full-screen. Furthermore, proctors can click the "camera" button (e.g., the function 720 as shown in FIG. 7B) in the top right corner of Behavior View 430 to take a screenshot of the current video and view the screenshots in the Playback View 440.

At step 240, the visual analytics system causes the display of the visualizations. In some embodiments, the visual analytics system may cause the display of the visualizations on a display that is integrated in or connected to the visual analytics system. The visualizations may be embedded in a graphic user interface (GUI), which may further include various functions allowing interactions by proctors.

The embodiments disclosed hereinafter demonstrate exemplary applications implementing the visual analytics system 150 of FIG. 1B by performing processes disclosed in the visual analytics process 200 of FIG. 2 so as to facilitate proctoring of online exams. As described above, the visual analytics system 150 may identify high-risk behaviors as suspected cases and present visualizations in different levels of detail as shown in FIG. 4. A proctor as a reviewer may verify the suspected cases by investigating the visualizations.

In one embodiment, the visual analytics system 150 may be implemented in the following workflow to identify a cheating case by observing mouse movements in a convenient and reliable manner. An exemplary inspection process is presented in FIG. 8A. First, in a Control Panel 802, the proctor may select an exam 804 with ID "Exam B," and sort students in the Student List View 410 according to their level of risk. Second, the proctor may browse the Student List View 410 to find students with high risks. For instance, the proctor may find among these students, a student 808, having an ID of 142121, whose risks of several types of suspected cases are higher than median values as shown in graphs 810, which include a glyph similar to the glyph 500 of FIG. 5A and a diagram similar to the diagram 550 of FIG. 5B. Third, the proctor may expand the Question List View 420 of the student 808 to further investigate if the student really cheated in the online exam. The Question List View 420 may include estimated risks per question similar to the question blocks as shown in FIG. 6. The proctor may identify two most suspected questions, such as mc_5 and mc_6 by observing the widths of blocks and comparing the overall risk level with other students in the Student List View 410. As an example, in a question block 812 for the question mc_6, the proctor may find a large number of suspected cases of h indicating abnormal head poses and b indicating "blur and focus" events. To investigate the abnormal head poses, the proctor may click on the block 812 of mc_6 to further investigate the student's detailed behaviors during the exam as plotted in the Behavior View 430. In the Behavior View 430, the proctor may first notice that there are multiple abnormal head poses near the end of the question-answering process in a suspected case chart similar to the chart 706 as shown in FIG. 7B. The proctor may further inspect the first and second behavior charts 702 and 704 for detailed head poses, which may be compared with the heatmaps (e.g., 708, 710, 712, and 714) to determine whether these abnormal head poses are led by the question or the habits of the student 808. If the proctor determines that these abnormal head poses are not led by the question or the habits of the student 808, the proctor may click on the first and/or second behavior charts at the beginning of those abnormal head poses to inspect the corresponding video in the Playback View 440. In the video, the proctor may find that the student 808 was drinking water as evidenced by a screenshot 814 in the Playback View 440. Thus, the proctor may determine these abnormal head poses as normal behaviors at low risk of cheating. Then, the proctor may investigate the identified events of "blur and focus." The proctor may inspect the occurrences of the "blur and focus" and potentially related "copy and paste" events in the suspected case chart 706 and/or the first and second behavior charts 702 and 704 in the Behavior View 430. If the proctor finds that the student's mouse was at the boundary of the web page and stayed for a while until "copy and paste" events occurred, the proctor may suspect with high confidence that the student 808 copied materials outside the exam web page and pasted these materials to the exam web page. Based on this evidence, the proctor may verify that the case of the student 808 is a cheating case.

This embodiment demonstrates a user case when the proctor utilizes the visualizations generated by the visual analytics system 150 to quickly locate and verify suspected cases. This embodiment also demonstrates that mouse movement data provides a new perspective to find cheating cases.

Figure 8A:
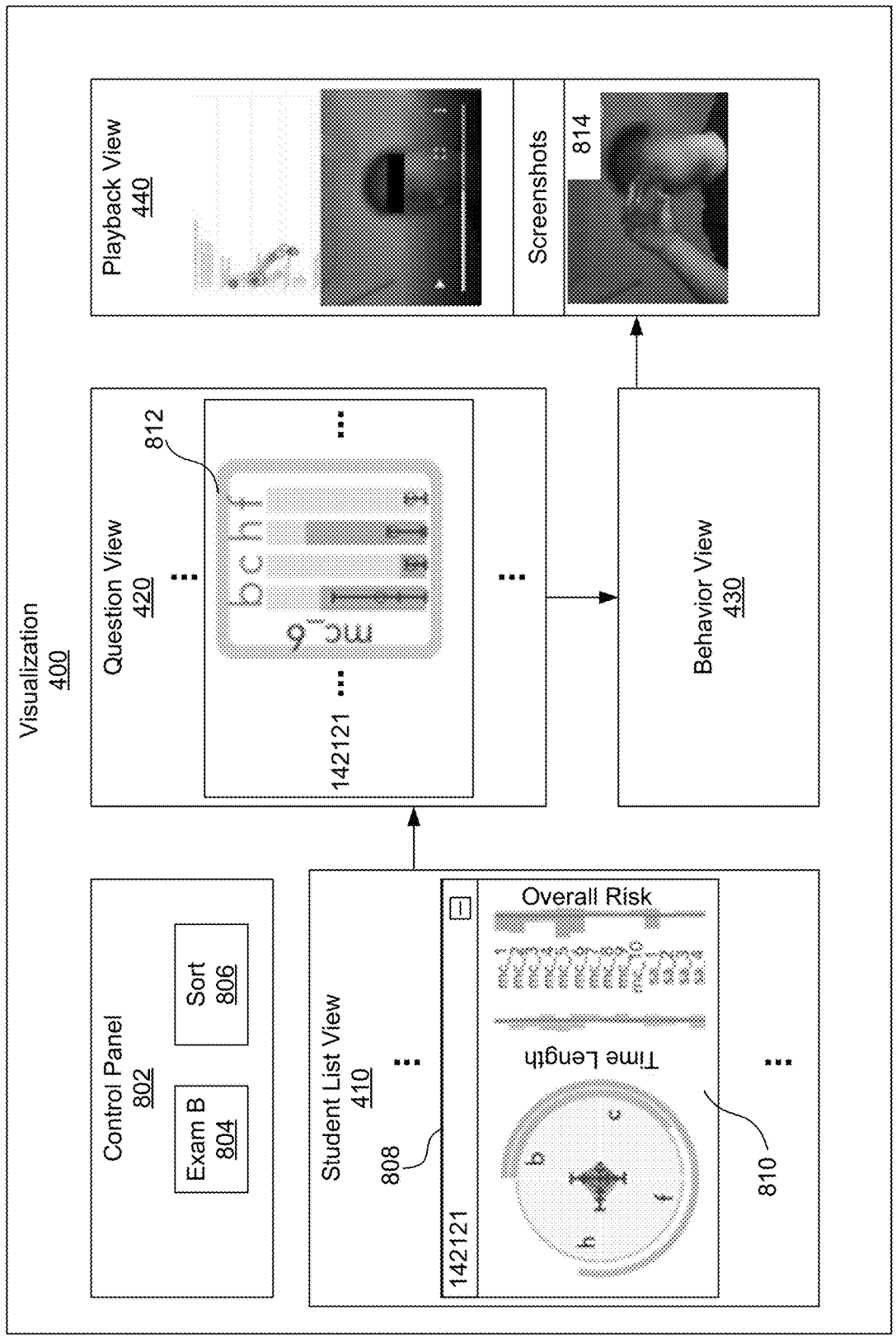
FIGS. 8A-8C illustrate exemplary inspection processes, in accordance with one or more embodiments of the present disclosure.
Figure 8B:
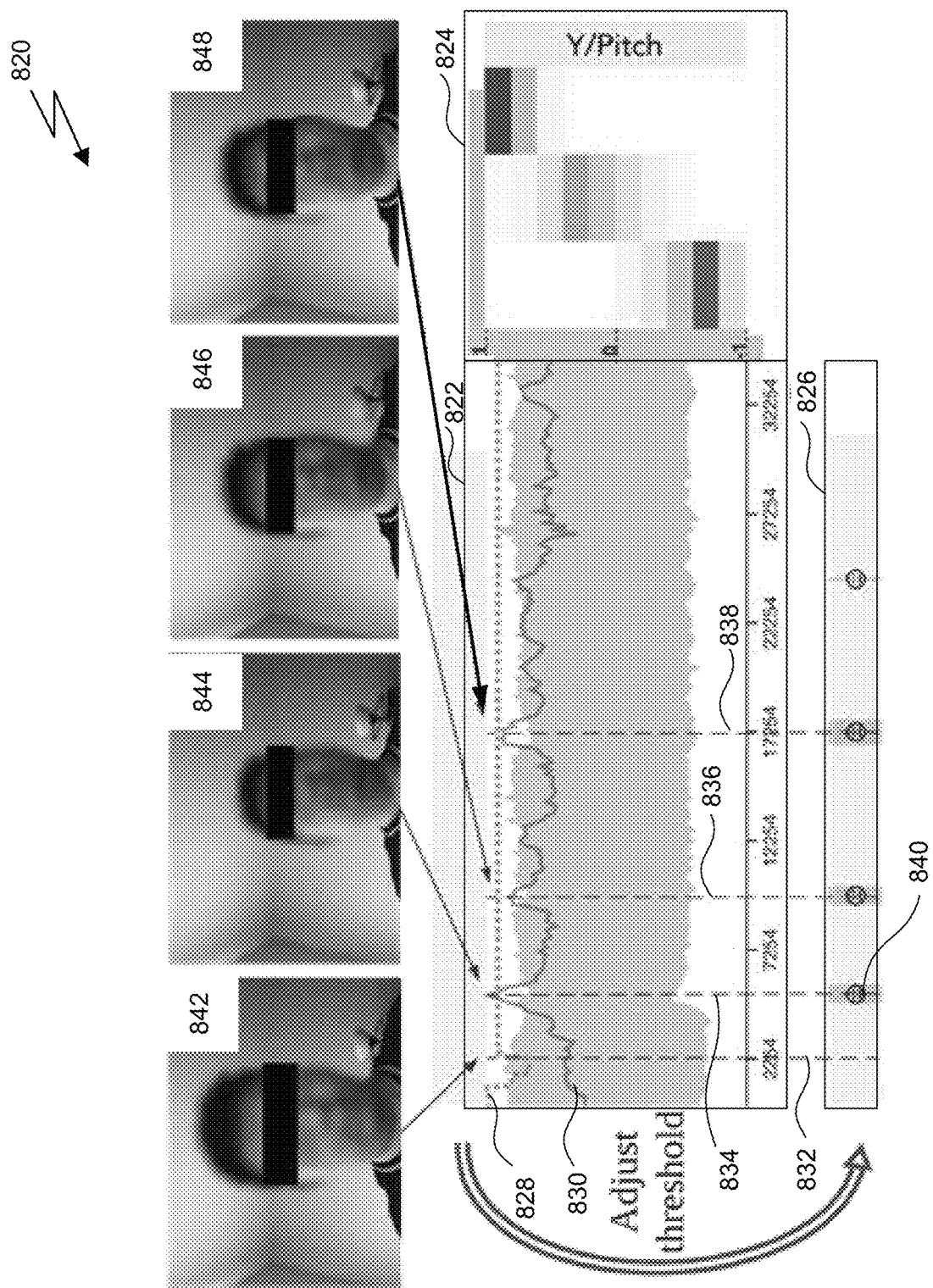

In another embodiment, the visual analytics system 150 may be utilized to identify a cheating case through an in-depth inspection on head movements. In this embodiment, the detection engine of the visual analytics system 150 may not detect suspected cases during a period associated with a question for a student. In this case, the proctor may need to inspect the detailed behavior charts in the Behavior View 430 to investigate if the student has any risk of cheating. An exemplary inspection process 820 is presented in FIG. 8B. As shown in FIG. 8B, the proctor may inspect the behavior chart 822 for a current student, the corresponding heatmap 824 by all students and the suspected case chart 826 identified for the current student. The behavior chart 822 may include a dot plot 828 for mouse positions and a line plot 830 for head poses. The suspected case chart 826 may include glyphs 840 for suspected cases identified by the detection engine of the visual analytics system 150. In this embodiment, the suspected case chart 826 may not present any suspected cases before an adjustment of thresholds for the detection engine. For example, the proctor may first notice a sudden change of head positions after the student's mouse stops moving at a first moment 832, according to the behavior chart 822 in the Behavior View 430. The proctor may further check the size of the bounding box as the range of the shadowed area plotted in the behavior chart 822. If the bounding box becomes smaller (e.g., at a second moment 834), the proctor confirms that the distance between the student's face and the screen becomes larger. Then, the proctor may inspect the student's head poses according to the behavior chart 822 and the heatmap 824 in the Behavior View 430. For instance, the proctor may find that the student's head poses are frequently outside his normal range of pitch angles by comparing the behavior chart 822 of the current student with the heatmap 824 by all students. Then, the proctor may inspect the related video in the Playback View 440. For example, the proctor may find that the student raised his/her head at the second moment 834, a third moment 836 and a fourth moment 838, and afterward looked at something other than the laptop screen. Screenshots 842, 844, 846 and 848 are captured for the moments 832, 834, 836 and 838, respectively. The screenshots 842, 844, 846 and 848 may be presented in the Playback View 440 as shown in FIG. 4 or 8A. Based on this evidence, the proctor may determine this case to be a potential cheating case.

When the proctor notices that the detection engine with the current setting overlooked abnormal head poses as described in this embodiment, the proctor may adjust the threshold settings provided by the visualizations generated by the visual analytics system 150. For instance, the proctor may lower the threshold related to the abnormal head poses from a default value (i.e., 3) to 2. In this way, head poses of smaller variation than the default will also be identified as suspected cases by the detection engine of the visual analytics system 150. As a result, additional suspected cases represented by glyphs 840 may appear in the suspected case chart 826 in the Behavior View 430. Likewise, the visual analytics system 150 may provide options for proctors to adjust threshold values for different types of abnormal behaviors so as to cope with different online exams, which may have different requirements for proctoring.

Figure 8C:
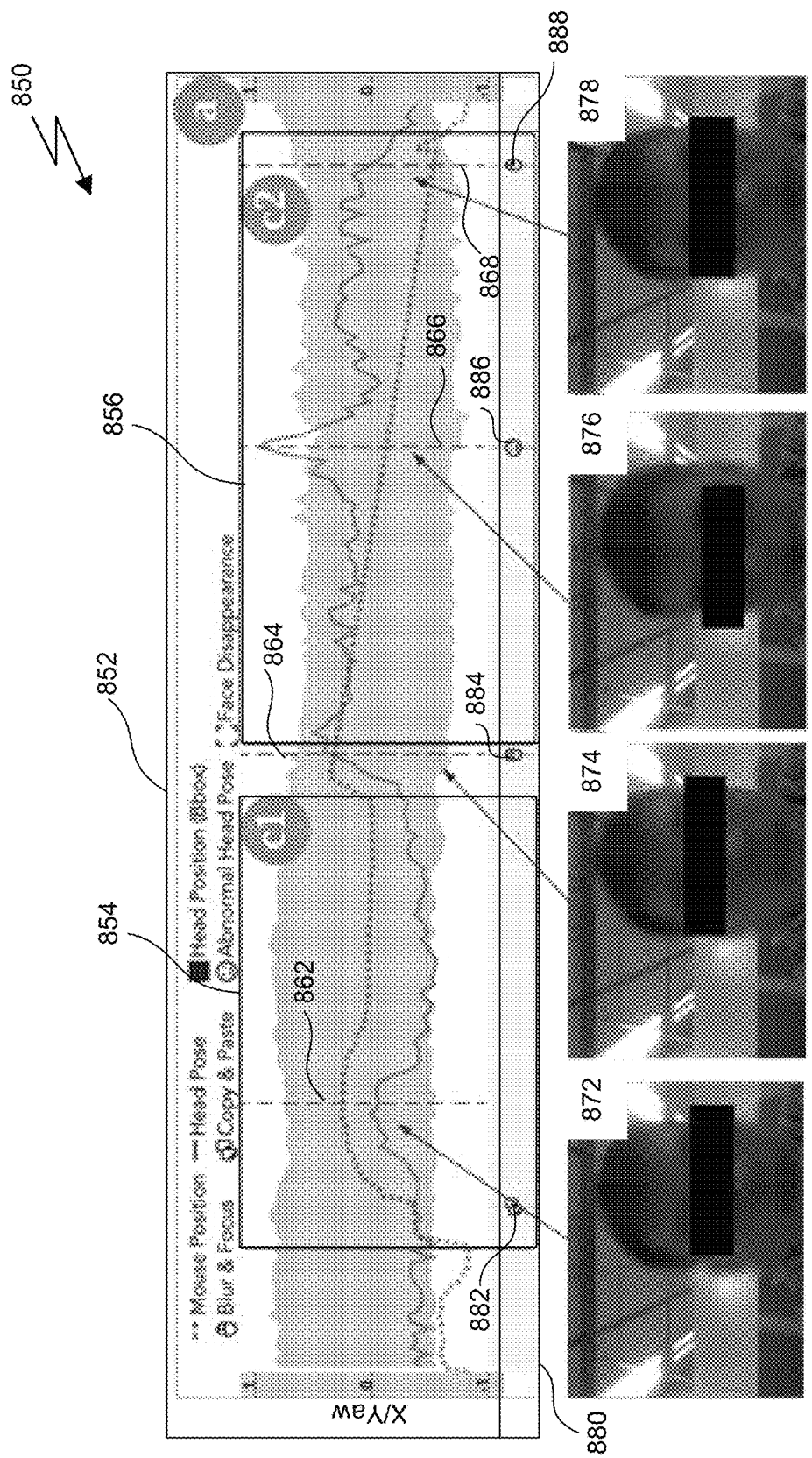

In still another embodiment, the visual analytics system 150 may be utilized to identify a cheating case based on the inconsistency between head and mouse movements. An exemplary inspection process 850 is presented in FIG. 8C. The proctor may investigate the consistency of a student's head and mouse movements by inspecting the behavior chart 852 on X-axis and Yaw angles in the Behavior View 430 of the student. For example, the proctor may notice that the student's head and mouse movements are consistent initially (e.g., during a first period 854), but vary a lot in the latter stage (e.g., during a second period 856). The proctor may find out that the initial consistency of the student's head and mouse movement behaviors indicates the student continuously looking at the cursor of the mouse, as shown in a screenshot 872 at a first moment 862 and a screenshot 874 at a second moment 864. As shown in FIG. 8C, a suspected case 886 indicating abnormal head poses is presented in the suspected case chart 880. The inconsistent behaviors may indicate that either the student does not look at the cursor or the student leaves the current web page. The proctor may further investigate the suspected case chart 880 in the Behavior View 430 and find two suspected cases 884 and 888 indicating "blur and focus" events. Because the suspected cases 884 and 888 occurred at the beginning and the end of the second period 856 of the inconsistency, respectively, the proctor may confirm that the student left the exam web page. If the proctor also finds a suspected case 882 indicating a "copy and paste" event, which is related to the inconsistency period 856, the entire cheating process can be inferred, for example as including the steps that the student copied the question content, searched it or ran it in an Integrated Development Environment (IDE), and possibly copied materials from the outside sources to the web page of the exam.

This embodiment demonstrates that the visualizations generated by the visual analytics system 150 can enable the identification of cheating behaviors by exploring the inconsistency between head and mouse movements, which may not be revealed in videos due to no suspected head movements.

Figure 9A:
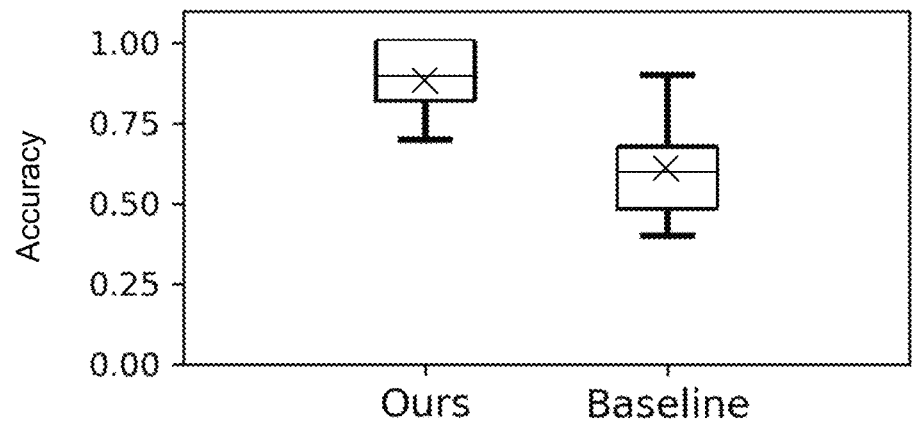
FIGS. 9A-9B illustrate experimental results, in accordance with one or more embodiments of the present disclosure.
Figure 9B:
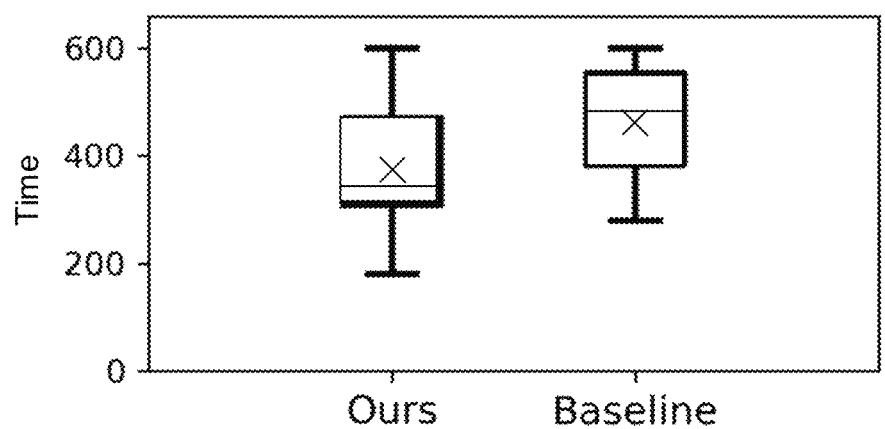

In an exemplary implementation, it was demonstrated that the techniques discussed in the present disclosure were able to achieve improvements of accuracy and cost of time relative to proctoring based on review of raw video. In some experiments, proctoring using the visualizations as shown in FIG. 4B is compared with proctoring by viewing raw videos. FIGS. 9A and 9B demonstrate comparisons in terms of accuracy and cost of time, respectively. In FIGS. 9A and 9B, the proctoring by viewing raw videos are referred to as "Baseline," while the proctoring using the visualizations disclosed in the present disclosure is denoted as "Ours." The performances of the two proctoring methods are plotted in the boxplot style, showing the first $1^{st}$, $2^{nd}$ and $3^{rd}$ quartiles, as well as distributions. The boxplots are overlaid by the mean values, which are visualized as "x" symbols. These comparisons indicate a 46.5% improvement in accuracy and a 19.3% reduction in cost of time by implementing the visual analytics system in the present disclosure. Table 1 shows comparisons of false positive and false negative rates between the proctoring using the visualizations disclosed in the present disclosure and the baseline. In Table 1, "Average" denotes average value, and "SD" denotes standard deviation.

TABLE 1

Comparisons of false positive and false negative rates.

|  |  | Ours | Baseline |
|---|---|---|---|
| False positive rate | Average | 0.019 | 0.313 |
|  | SD | 0.054 | 0.163 |
| False negative rate | Average | 0.210 | 0.500 |
|  | SD | 0.229 | 0.239 |

Table 1 demonstrates reductions of 93.9% and 58% in the false positive and false negative rates, respectively, when the proctoring process implements the visual analytics system in the present disclosure. In some experiments, reviewers are instructed to review 15-minute video clips of an exam. Results show that the reviewers using the visual analytics system in the present disclosure spent an average of 6.24 minutes to review a video clip and identified cheating cases with an average accuracy of 0.888. As a reference, the reviewers reviewing the video clips without using the visual analytics system in the present disclosure spent an average of 7.73 minutes to review a video clip and identified cheating cases with an average accuracy of 0.606.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The invention claimed is:

1. system for proctoring online exams, comprising:
    a client-side computing system, comprising a camera configured to obtain video data corresponding to a user while taking an exam and one or more input devices configured to obtain interaction data, wherein the interaction data includes mouse movements of the user while taking the exam; and
    a visual analytics system configured to:
    obtain the video data and the interaction data from the client-side computing system;
    analyze the exam data to detect abnormal behavior by the user, wherein analyzing the exam data to detect abnormal behavior is based at least in part on mouse movement data;
    generate one or more visualizations of the analyzed exam data; and
    display the one or more visualizations to a reviewer to facilitate the reviewer determining whether or not the user cheated during the exam;
    wherein the one or more visualizations include information of a first level, a second level and a third level;
    wherein the information of the first level includes a list of students taking the exam and overall risk evaluations associated with the students in the list of students, wherein a respective overall risk evaluation associated with a respective student indicates an overall risk of all types of abnormal behaviors associated with the respective student;
    wherein the information of the second level includes a list of questions in the exam and risk evaluations associated with respective questions in the list of questions; and
    wherein the information of the third level includes obtained video data and/or obtained interaction data associated with a respective question among the list of questions.

2. The system according to claim 1, wherein the visual analytics system is configured to display a second visualization including the information of the second level in response to a reviewer selecting a respective student among the list of students in a first visualization including the information of the first level.

3. The system according to claim 2, wherein the visual analytics system is configured to display a third visualization including the information of the third level in response to the reviewer selecting a respective question among the list of questions in the second visualization.

4. The system according to claim 3, wherein the visual analytics system in configured to play a video or animation in response to the reviewer selecting an image frame in the third visualization.

5. The system according to claim 1, wherein analyzing the exam data to detect abnormal behavior by the user further comprises:
    analyzing head poses and head positions of the user based on the video data; and
    determining abnormal head movements based on the head poses and head positions.

6. The system according to claim 5, wherein the abnormal head movements comprise abnormal head poses and face disappearances, and wherein determining the abnormal head movements based on the head poses and head positions further comprises:
    determining an abnormal head pose in response to at least one of a yaw angle, a pitch angle, or a roll angle being greater than a threshold value; and
    determining a face disappearance in response to the head positions of the user being unavailable in a number of image frames in the video data.

7. The system according to claim 1, wherein analyzing the exam data to detect abnormal behavior by the user further comprises:
    generating a bounding box corresponding to the face of the user on an image frame in the video data, wherein the size of the bounding box is based on a distance between the face of the user and a screen.

8. The system according to claim 1, wherein the interaction data comprises data associated with copy, paste, focus, or blur events, mouse movement, and mousewheel rolling, and wherein analyzing the exam data to detect abnormal behavior by the user further comprises:
    identifying the copy, paste, focus, or blur events.

9. A method for proctoring online exams using a visual analytics system, comprising:
    collecting, by the visual analytics system, exam data corresponding to a user taking an exam, wherein the exam data includes video data and interaction data;
    analyzing, by the visual analytics system, the exam data to detect abnormal behavior by the user;
    generating, by the visual analytics system, one or more visualizations of the analyzed exam data; and
    displaying, by the visual analytics system, the one or more visualizations to a reviewer to facilitate the reviewer determining whether or not the user cheated during the exam;
    wherein the one or more visualizations include information of a first level, a second level and a third level;
    wherein the information of the first level includes a list of students taking the exam and overall risk evaluations associated with the students in the list of students, wherein a respective overall risk evaluation associated with a respective student indicates an overall risk of all types of abnormal behaviors associated with the respective student;
    wherein the information of the second level includes a list of questions in the exam and risk evaluations associated with respective questions in the list of questions; and
    wherein the information of the third level includes obtained video data and/or obtained interaction data associated with a respective question among the list of questions.

10. The method of claim 9, wherein a second visualization including the information of the second level is displayed by the visual analytics system in response to a reviewer selecting a respective student among the list of students in a first visualization including the information of the first level.

11. The method of claim 10, wherein a third visualization including the information of the third level is displayed by the visual analytics system in response to the reviewer selecting a respective question among the list of questions in the second visualization.

12. The method of claim 11, wherein the visual analytics system plays a video or animation in response to the reviewer selecting an image frame in the third visualization.

13. The method of claim 9, wherein analyzing the exam data to detect abnormal behavior by the user further comprises:
analyzing head poses and head positions of the user based on the video data; and
determining abnormal head movements based on the head poses and head positions.

14. The method of claim 13, wherein the abnormal head movements comprise abnormal head poses and face disappearances, and wherein determining the abnormal head movements based on the head poses and head positions further comprises:
determining an abnormal head pose in response to at least one of a yaw angle, a pitch angle, or a roll angle being greater than a threshold value; and
determining a face disappearance in response to the head positions of the user being unavailable in a number of image frames in the video data.

15. The method of claim 9, wherein analyzing the exam data to detect abnormal behavior by the user further comprises:
generating a bounding box corresponding to the face of the user on an image frame in the video data, wherein the size of the bounding box is based on a distance between the face of the user and a screen.

16. The method of claim 9, wherein the interaction data comprises data associated with copy, paste, focus, or blur events, mouse movement, and mousewheel rolling, and wherein analyzing the exam data to detect abnormal behavior by the user further comprises:
identifying the copy, paste, focus, or blur events.

17. The method of claim 9, wherein the visual analytics system includes one or more functions in at least one visualization among the one or more visualizations, and the one or more functions are configured to adjust configurable parameters for detecting the abnormal behavior.

18. A non-transitory computer-readable medium having processor-executable instructions stored thereon for proctoring online exams using a visual analytics system, wherein the processor-executable instructions, when executed, facilitate performance of the following:
collecting, by the visual analytics system, exam data corresponding to a user taking an exam, wherein the exam data includes video data and interaction data;
analyzing, by the visual analytics system, the exam data to detect abnormal behavior by the user;
generating, by the visual analytics system, one or more visualizations of the analyzed exam data; and
displaying, by the visual analytics system, the one or more visualizations to a reviewer to facilitate the reviewer determining whether or not the user cheated during the exam;
wherein the one or more visualizations include information of a first level, a second level and a third level;
wherein the information of the first level includes a list of students taking the exam and overall risk evaluations associated with the students in the list of students, wherein a respective overall risk evaluation associated with a respective student indicates an overall risk of all types of abnormal behaviors associated with the respective student;
wherein the information of the second level includes a list of questions in the exam and risk evaluations associated with respective questions in the list of questions; and
wherein the information of the third level includes obtained video data and/or obtained interaction data associated with a respective question among the list of questions.

19. The non-transitory computer-readable medium of claim 18, wherein a second visualization including the information of the second level is displayed by the visual analytics system in response to a reviewer selecting a respective student among the list of students in a first visualization including the information of the first level; and
wherein a third visualization including the information of the third level is displayed by the visual analytics system in response to the reviewer selecting a respective question among the list of questions in the second visualization.

20. The non-transitory computer-readable medium of claim 19, wherein the processor-executable instructions, when executed, further facilitate performance of the following:
playing, by the visual analytics system, a video or animation in response to the reviewer selecting an image frame in the third visualization.

* * * * *